(12) United States Patent
Tanaka et al.

(10) Patent No.: US 6,597,389 B2
(45) Date of Patent: *Jul. 22, 2003

(54) CAMERA CONTROL SYSTEM AND CAMERA CONTROL APPARATUS

(75) Inventors: Koichiro Tanaka, Tokyo (JP); Hiroki Yonezawa, Tokyo (JP); Yasuo Nakamura, Yokohama (JP); Akitomo Sasaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,800

(22) Filed: Jan. 28, 1997

(65) Prior Publication Data

US 2001/0019360 A1 Sep. 6, 2001

(30) Foreign Application Priority Data

Jan. 30, 1996 (JP) .............................................. 8-013476
Dec. 24, 1996 (JP) .............................................. 8-343471

(51) Int. Cl.[7] ................................................ H04N 7/14
(52) U.S. Cl. .................................................. 348/14.08
(58) Field of Search ........................ 348/38, 175, 372, 348/211, 212, 207, 15, 123, 143, 159, 153, 14.03, 14.08; 340/825.52, 825.53, 825.57, 725; H04N 7/14, 7/15

(56) References Cited

U.S. PATENT DOCUMENTS

| 4,369,467 A | * | 1/1983 | Smith | 358/210 |
|---|---|---|---|---|
| 4,782,393 A | * | 11/1988 | Kawanura | 348/212 |
| 4,989,085 A | * | 1/1991 | Elberbaum | 348/211 |
| 4,992,866 A | * | 2/1991 | Morgan | 358/108 |
| 5,206,732 A | * | 4/1993 | Hudson | 348/159 |
| 5,229,850 A | * | 7/1993 | Toyoshima | 358/108 |
| 5,305,100 A | * | 4/1994 | Choi | 348/159 |
| 5,517,236 A | * | 5/1996 | Sergeant et al. | 348/143 |
| 5,541,656 A | * | 7/1996 | Kare et al. | 348/333 |
| 5,546,072 A | * | 8/1996 | Creuseremee | 348/143 |
| 5,568,183 A | * | 10/1996 | Cortjens et al. | 348/15 |
| 5,579,060 A | * | 11/1996 | Elberbaum | 348/705 |
| 5,583,796 A | * | 12/1996 | Reese | 364/550 |
| 5,608,653 A | * | 3/1997 | Palmer et al. | 348/14 |
| 5,659,369 A | * | 8/1997 | Imaiida | 348/556 |
| 5,675,358 A | * | 10/1997 | Bullock et al. | 345/115 |
| 5,689,300 A | * | 11/1997 | Shibata et al. | 348/15 |
| 5,801,771 A | * | 9/1998 | Ohwaki et al. | 348/211 |
| 5,854,654 A | * | 12/1998 | Zwahlen et al. | 348/159 |
| 5,886,738 A | * | 3/1999 | Hellenbeck et al. | 348/143 |
| 5,923,363 A | * | 7/1999 | Elberbaum | 348/156 |
| 6,111,662 A | * | 8/2000 | Sato et al. | 358/442 |

* cited by examiner

Primary Examiner—Wendy R. Garber
Assistant Examiner—Rashawn N. Tillery
(74) Attorney, Agent, or Firm—Fitzpatrick, Cella, Harper & Scinto

(57) ABSTRACT

A camera control system has one or more cameras, power supply to which can be externally controlled, one or more camera management devices for managing the cameras, one or more terminal stations which communicate with the camera management devices to display images from the cameras, and an instruction device for generating a power turn-on/off instruction of an arbitrary one of the cameras from the terminal station.

9 Claims, 22 Drawing Sheets

CAMERA CONTROL SYSTEM AND CAMERA CONTROL APPARATUS

BACKGROUND OF THE INVENTION

1. Field of the Invention

The present invention relates to a camera control system and, more particularly, to a camera control apparatus used in a system for displaying images from at least one camera connected to a network and remote-controlling the camera.

2. Related Background Art

A conventional remote monitoring system using a plurality of cameras includes a plurality of video cameras, a synthesizer for analog-synthesizing images from these video cameras, and a switching device called a switcher that can freely select an image from an arbitrary camera. Such system is mainly used inside a relatively small-scale building, and is called a local monitoring system. In contrast to such local monitoring system, a remote monitoring system, in which a plurality of cameras are connected to a LAN (local area network) or a digital network such as a public digital network (ISDN) or the like, so that more, farther cameras can be connected flexibly, has been proposed.

In recent remote monitoring systems, a personal computer or a workstation is used as a monitoring terminal to realize video display and system control by means of a graphical user interface (GUI). When the monitoring terminal uses the GUI of the computer, it becomes easy even for a person who is not skilled in the apparatus to operate such system. In particular, since the positions and directions of cameras that output camera images are superimposed on a map indicating the layout state of the cameras simultaneously with the camera images on the monitor, the current situation can be intuitively recognized, and a quick response can be made, e.g., when an emergency state has occurred.

Even in the conventional remote monitoring system that uses the network, the power switch of each camera must be turned on. Therefore, at the beginning of the operation, the power switches of all the cameras must be turned on at the corresponding places. When a camera is set at an inaccessible place, it is very difficult to temporarily turn off its power switch. In view of this problem, cameras in some systems are always kept ON.

When the power switches of cameras are turned on individually, or when the cameras are kept ON, wasteful power consumption may increase. For example, a camera set at a place to be temporarily monitored need only be turned on only when it is required. However, the conventional system cannot meet such requirements.

SUMMARY OF THE INVENTION

It is an object of the present invention to provide a camera control system and apparatus and their related arrangements, which can solve the above-mentioned problems and can remote-control power supply to cameras.

In order to achieve the above object, according to an embodiment of the present invention, the following arrangements are provided.

According to one aspect of the present invention, there is provided a camera control system comprising at least one camera, power supply to which can be externally controlled, at least one camera management means for managing the at least one camera, at least one terminal station which communicates with the camera management means to display an image from the at least one camera, and instruction means for generating a power turn-on/off instruction of an arbitrary one of the at least one camera from the terminal station.

According to another aspect of the present invention, there is provided a camera control system comprising at least one camera, power supply to which can be externally controlled, at least one camera management means for managing the at least one camera, at least one terminal station which communicates with the camera management means and has a display unit for displaying an image input from the at least one camera, switch means for switching the camera which inputs the image to be displayed on the display unit, and instruction means for generating a power turn-off instruction of the camera that inputs an image which ceases to be displayed on the display unit upon switching by the switch means.

According to still another aspect of the present invention, there is provided a camera control system comprising at least one camera, power supply to which can be externally controlled, at least one camera management means for managing the at least one camera, and at least one terminal station which communicates with the camera management means and has a display unit for displaying an image input from the at least one camera, wherein the camera management means sends a predetermined camera's power turn-off request to all the terminal stations.

According to still another aspect of the present invention, there is provided a camera control apparatus for externally instructing an operation of an arbitrary one of at least one camera, comprising power ON/OFF informing means for informing predetermined camera management means of a power ON/OFF state of an arbitrarily designated camera, and wherein the power ON/OFF informing means comprises pseudo button display means for displaying a pseudo power control button on a screen of a terminal station, and pointer means for operating the pseudo button.

According to still another aspect of the present invention, there is provided a camera control apparatus for externally instructing an operation of an arbitrary one of at least one camera, comprising a display unit for displaying an image input from the at least one camera, switch means for switching the camera that inputs the image to be displayed on the display unit, and instruction means for generating a power turn-off instruction of the camera that inputs an image which ceases to be displayed on the display unit upon switching by the switch means.

According to still another aspect of the present invention, there is provided a storage medium which stores a program for externally instructing an operation of an arbitrary one of at least one camera, wherein said storage medium stores a camera control program comprising steps of displaying a pseudo power control button on a screen and informing predetermined camera management means of a power ON/OFF state of an arbitrarily designated camera by operating the pseudo button.

According to still another aspect of the present invention, there is provided a storage medium which stores a program for externally instructing an operation of an arbitrary one of at least one camera, wherein said storage medium stores a camera control program comprising steps of displaying an image input from the at least one camera, instructing switching of the camera that inputs the image to be displayed, and instructing to turn off a power source of the camera that inputs the image which ceases to be displayed in accordance with the switching instruction.

Other objects and features of the present invention will become apparent from the following specification and the accompanying drawings.

DETAILED DESCRIPTION OF THE PREFERRED EMBODIMENTS

The embodiment of the present invention will be described in detail hereinafter with reference to the accompanying drawings.

Figure 1:
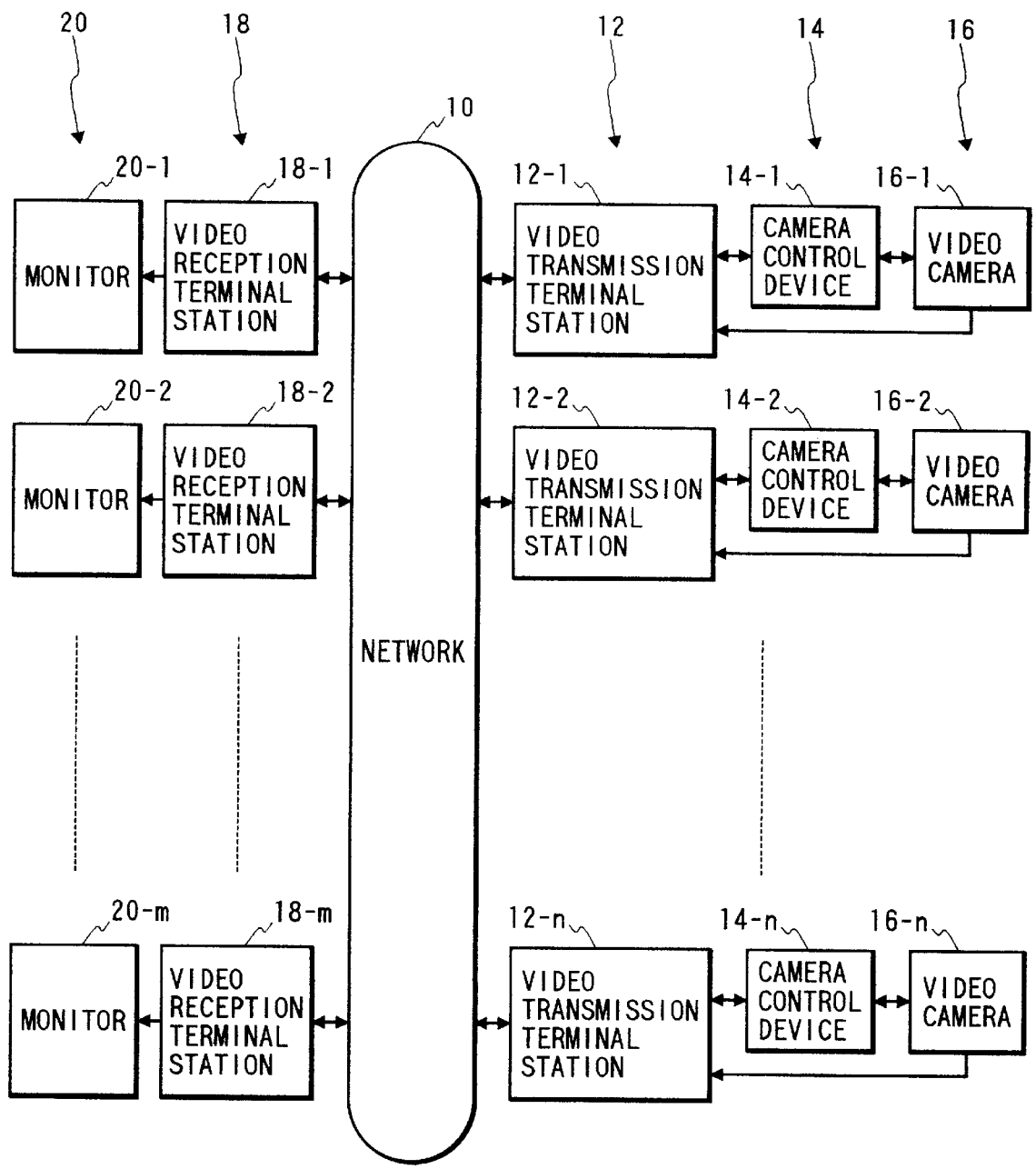
FIG. 1 is a schematic block diagram showing the overall arrangement according to an embodiment of the present invention.

FIG. 1 is a schematic block diagram showing the overall arrangement according to an embodiment of the present invention. A digital network 10 can digitally transmit video data and camera control information (including status information), and n video transmission terminal stations 12 (12-1 to 12-n) are. connected to the network 10. To the video transmission terminal stations 12 (12-1 to 12-n), video cameras 16 (16-1 to 16-n) are connected via camera control devices 14 (14-1 to 14-n). Each camera control device 14 (14-1 to 14-n) controls panning, tilting, zooming, focusing, stop, and the like of the corresponding video camera 16 (16-1 to 16-n) connected in accordance with a control signal from the corresponding terminal station 12 (12-1 to 12-n). On the other hand, each video camera 16 (16-1 to 16-n) receives power supply from the corresponding camera control device 14 (14-1 to 14-n), and the camera control device 14 can control the power ON/OFF state of the corresponding video camera 16 (16-1 to 16-n) in accordance with an external control signal.

To the network 10, video reception terminal stations (monitoring terminal stations) 18 (18-1 to 18-m) that receive and display video information transmitted from the video transmission terminal stations 12 (12-1 to 12-n) and are output onto the network 10 are connected. Monitor displays (to be simply referred to as monitors hereinafter) 20 (20-1 to 20-m) are respectively connected to the video reception terminal stations 18 (18-1 to 18-m).

Each video transmission terminal station 12 (12-1 to 12-n) compresses an output image (video) from the video camera 16 (16-1 to 16-n) connected by a predetermined compression method, and transmits the compressed video data to the video reception terminal station 18 as the video request source or all the video reception terminal stations 18 via the network 10. The video reception terminal station 18 that receives the video data displays the received image on the video display area of its monitor 20. Each video reception terminal station 18 can control various parameters (image sensing direction, image sensing magnification, focusing, stop, and the like) and power supply (from ON to OFF and vice versa) of an arbitrary camera 16 via the corresponding video transmission terminal station 12 and camera control device 14. Such operations will be described in detail later.

When a monitor is connected to the video transmission terminal station 12 and a video expansion device for expanding compressed video data is arranged, the terminal station 12 can serve as a video reception terminal station. Similarly, when the camera control device 14 and the video camera 16 are connected to the video reception terminal station 18, and a video compression device is arranged, the terminal station 18 can serve as a video transmission terminal station. Needless to say, a software program required for video transmission or video reception must be installed in such cases.

Figure 2:
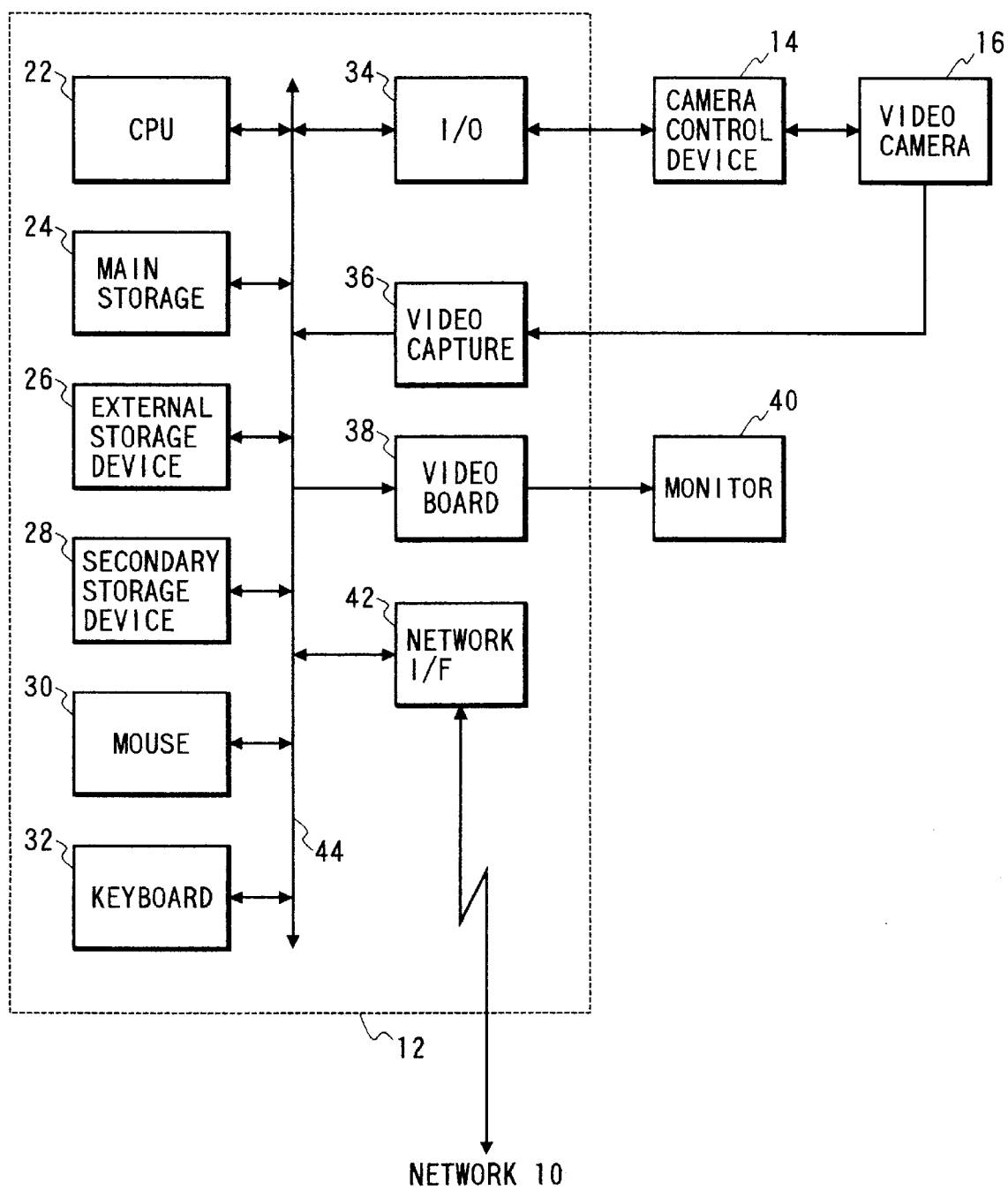
FIG. 2 is a schematic block diagram showing the arrangement of a video transmission terminal station 12 of the embodiment shown in FIG. 1.

FIG. 2 is a schematic block diagram of the video transmission terminal station to which neither a switcher nor a synthesizer are connected. The video transmission terminal station comprises a CPU 22 for controlling the entire station, a main storage 24, a removable external storage device 26 such as a floppy disk, CD-ROM, or the like, a secondary storage device 28 such as a hard disk or the like, a mouse 30 serving as a pointing device, a keyboard 32, an I/O board 34 which connects to the camera control device 14 and exchanges camera control signals with the device 14, and a video capture device 36 for capturing an output video signal from the video camera 16. The video capture device 36 of this embodiment comprises an A/D conversion function for converting an analog video signal into a digital signal, and a video compression function for compressing information. The terminal station also comprises a video board 38 for displaying video information on the screen of a monitor 40, a network interface (I/F) 42, and a system bus 44 for interconnecting the devices 22 to 38 and 42.

When the terminal station is exclusively used for video transmission, the video board 38 and the monitor 40 may be omitted.

As described above, the video transmission terminal station is nothing but a computer. With the above arrangement, the terminal station 12 transmits video data to the monitoring terminal stations at remote places via the network, and controls the camera 16 upon receiving camera control signals from the monitoring terminal stations.

Figure 13:
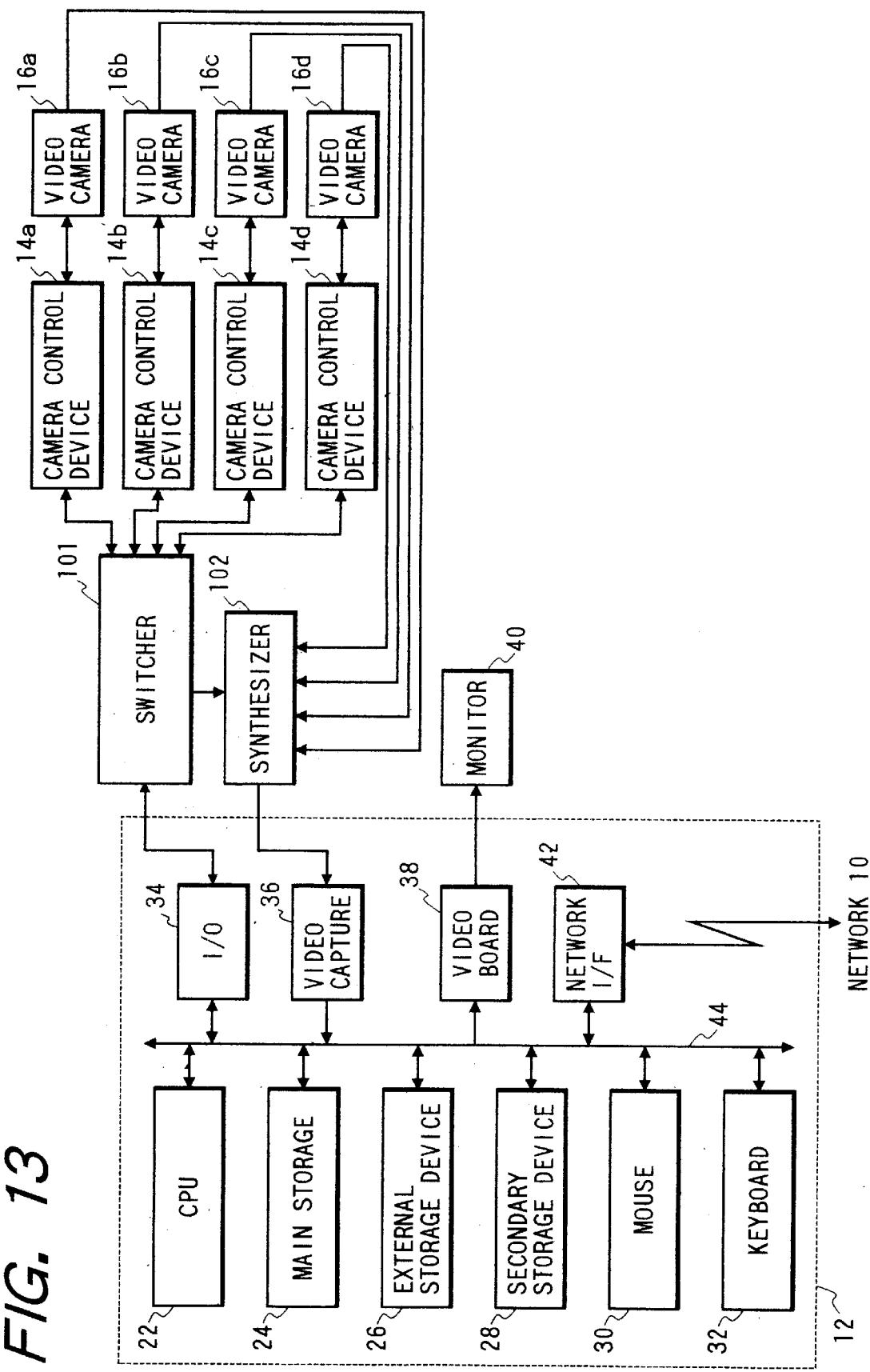
FIG. 13 is a schematic block diagram showing the arrangement of the video transmission terminal station 12 to which a plurality of video cameras are connected via a synthesizer and a switcher in the embodiment shown in FIG. 1.

FIG. 13 is a schematic block diagram showing the arrangement of the video transmission terminal station to which a switcher and a synthesizer are connected.

In FIG. 2, one video camera is connected per computer. However, in the example in FIG. 13, four camera control devices 14a to 14d and four video cameras 16a to 16d are connected via a switcher 101 and a synthesizer 102.

The synthesizer 102 will be explained below. The synthesizer 102 video-synthesizes analog moving image signals from the video cameras 16a to 16d, as indicated by an area 66a in FIG. 14. When the computer supplies a command to the synthesizer 102 via the switcher 101, a moving image signal from a certain video camera can be selectively displayed, as indicated by an area 66a in FIG. 15.

The switcher 101 will be explained below. In FIG. 13, four camera control devices are connected to the video transmission terminal station through a switcher, unlike in FIG. 2. When the computer controls a certain video camera, it must switch the camera control devices 14a to 14d to be controlled. The switcher 101 is a switching device used for this purpose. As described in the above paragraph, when a command is sent to the synthesizer 102, moving image signals from the video cameras can be selected or synthesized and displayed.

Figure 3:
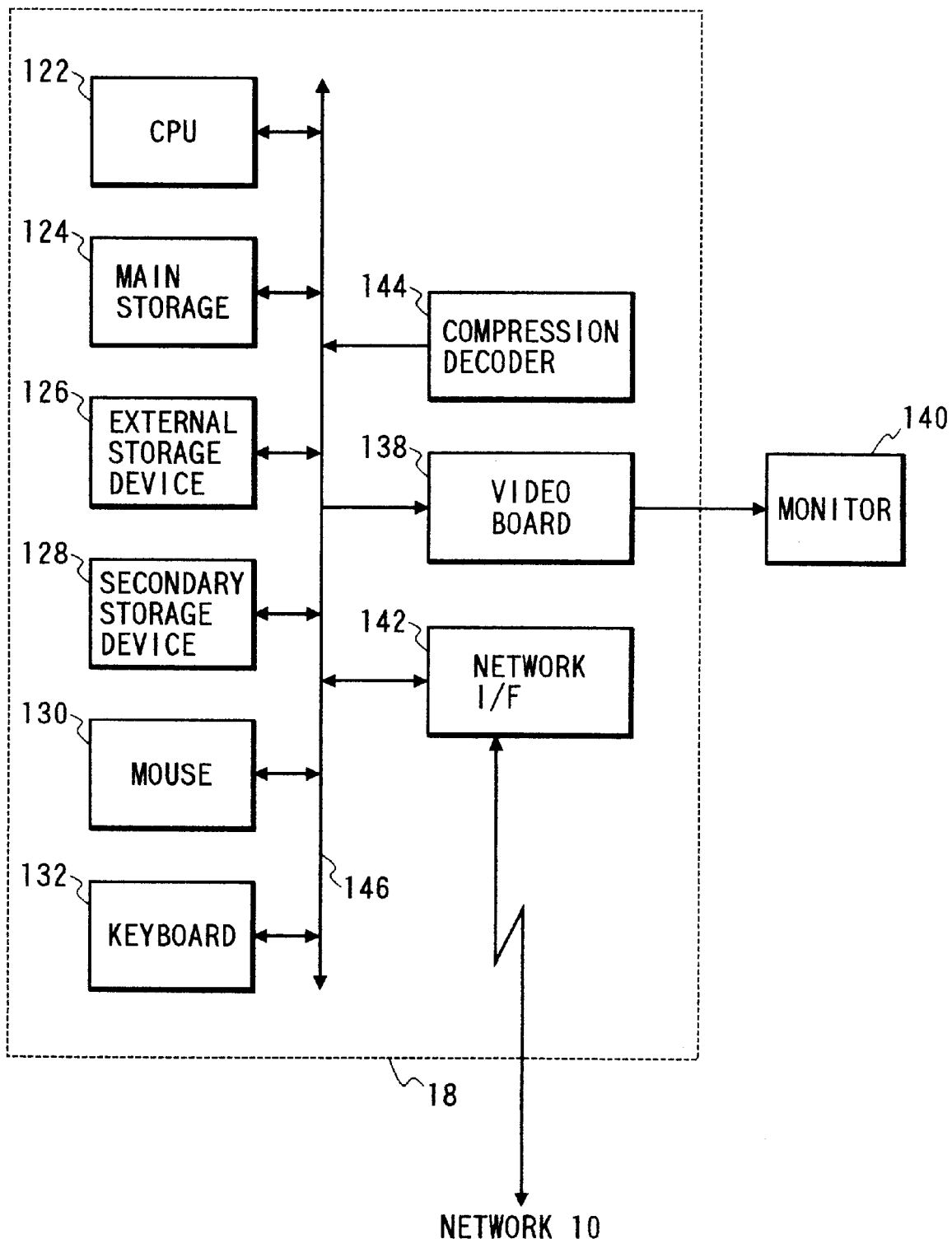
FIG. 3 is a schematic block diagram showing the arrangement of a video reception terminal station (monitoring terminal station) of the embodiment shown in FIG. 1.

FIG. 3 is a schematic block diagram showing the arrangement of the video reception terminal station (monitoring terminal station) 18. The video reception terminal station 18 comprise a CPU 122 for controlling the entire station, a main storage 124, a removable external storage device 126 such as a floppy disk, CD-ROM, or the like, a secondary storage device 128 such as a hard disk or the like, a mouse 130 serving as a pointing device, a keyboard 132, a video board 138 for displaying video information on the screen of a monitor 140, a network interface (I/F) 142, a compression decoder 144 for expanding compressed video information, and a system bus 146 for interconnecting the devices 122 to 132, 138, 142, and 144.

The video reception terminal station 18 has substantially the same arrangement as that of the video transmission terminal station 12 shown in FIG. 2, except that the terminal station 18 has no function of controlling the camera and capturing a camera image, comprises the decoder 144 for expanding compressed video data, and is installed with different system software. Some or all of the video reception terminal stations 18 can transmit camera control signals to arbitrary or certain video transmission terminal stations 12 which are given rights to control cameras. Upon receiving the camera control signal, the video transmission terminal station 12 controls the camera 16 in accordance with the contents of the camera control signal, and sends back the current state of the camera 16. The monitoring terminal station displays the current state of the corresponding camera in accordance with the received status signal. At the same time, the monitoring terminal station receives and expands video data supplied from the video transmission terminal stations and displays the images on the monitor screen in real time.

Figure 4:
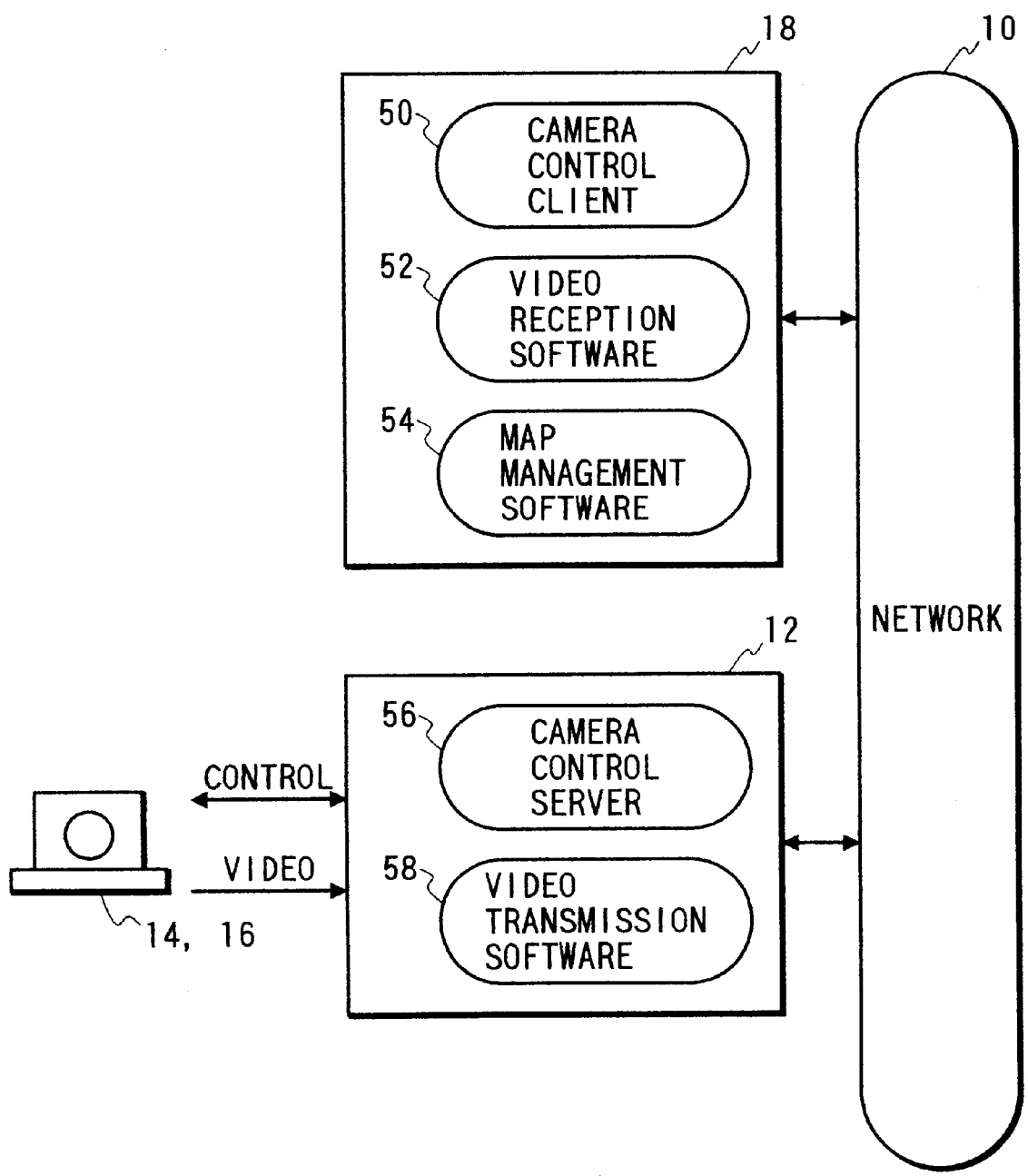
FIG. 4 is a schematic block diagram showing the software configuration of the embodiment shown in FIG. 1.

FIG. 4 shows the software configuration of this embodiment. In the video reception terminal station (monitoring terminal station) 18, a camera control client (software program) 50 for remote-controlling each camera 16 connected to the video transmission terminal station 12 connected to the network 10, a video reception software program 52 for expanding compressed video data from the video transmission terminal station 12 and displaying the expanded image on the monitor screen, and a map management software program 54 for displaying the layout positions and current states of the respective cameras 16 on a map as camera symbols, and displaying an operation panel for operating each camera 16 are installed.

The video reception software program 52 manages the cameras 16 connected to all the video transmission terminal stations 12 connected to the network 10, and has information unique to each camera 16 and various kinds of variable information (e.g., the camera name, the host name of the computer to which the camera 16 is connected, the camera state such as panning/tilting and zooming, information indicating whether or not the camera 16 is controllable, information indicating the currently controlled camera 16, information indicating the camera 16 the image of which is being currently displayed, and the like). These pieces of information are also supplied to the camera control client 50 and the map management software program 54, and are used for changing the displayed camera symbols.

In the video transmission terminal station 12, a camera control server 56 for controlling the camera 16 via the camera control device 14 in accordance with a request from the camera control client 50 and informing the current state of the camera 16 of the request source, and a video transmission software program 58 for compressing output video data from the camera 16 and transmitting the compressed data in a predetermined format to the request source via the network 10 are installed.

When the video cameras 16 are to be controlled via the switcher 101, as shown in FIG. 13, the camera control server 56 sends a command for selecting the video camera to be controlled to the switcher, thereby switching the camera control device to be controlled. Thereafter, the camera control server similarly controls the selected video camera via the switcher 101 and the camera control device 14 in accordance with a request from the camera control client 50.

Figure 5:
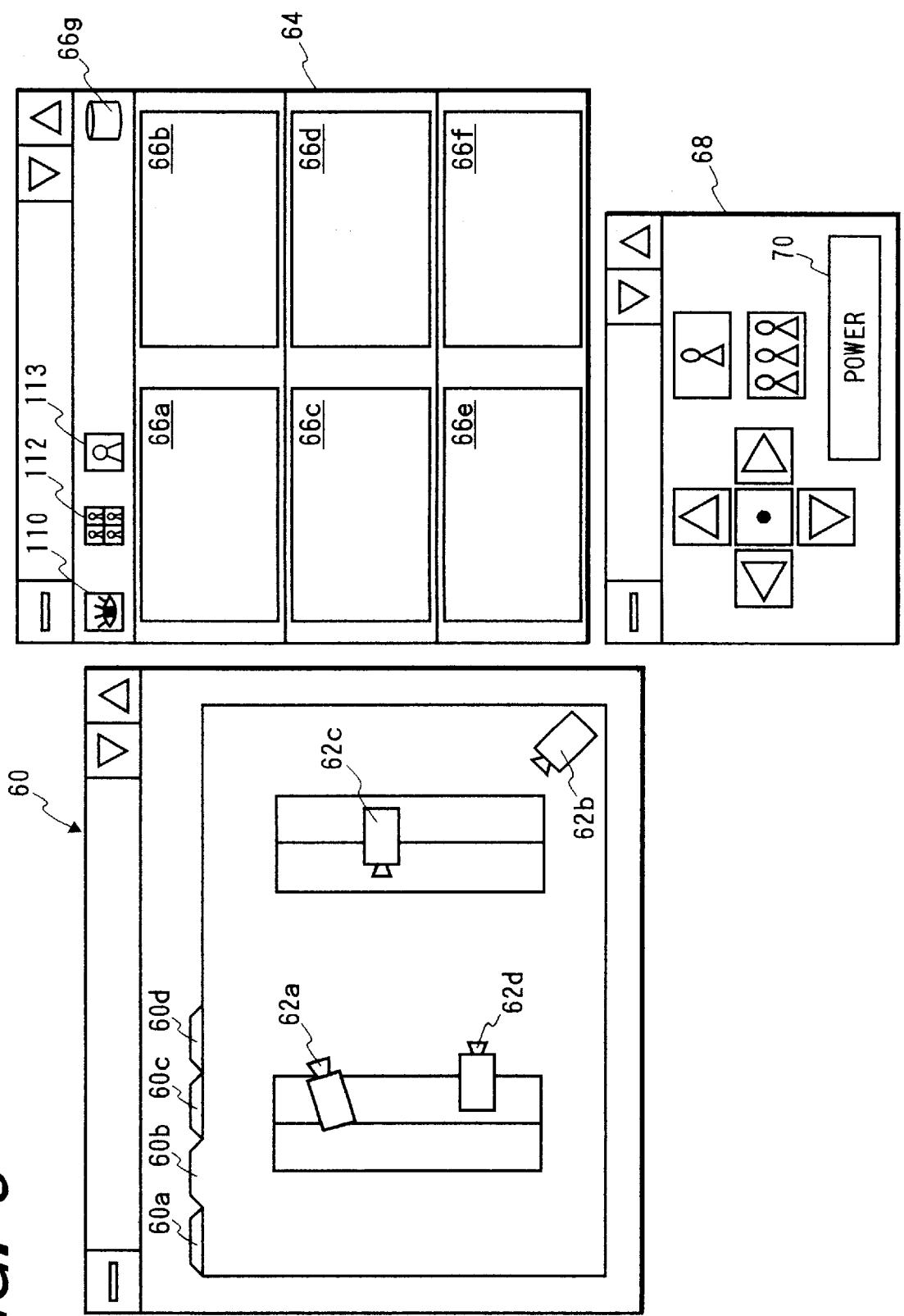
FIG. 5 is a view showing an image example on the monitoring terminal station of the embodiment shown in FIG. 1.

FIG. 5 shows an example of the display contents on the monitor screen of the video reception terminal station 18. A map window 60 shows the layout of an office, shop, warehouse, or the like in which the cameras 16 are set, and a plurality of maps 60a, 60b, 60c, and 60d can be selectively displayed. The number of maps 60a, 60b, 60c, and 60d that can be displayed depends on the performance of the system, and is not particularly limited. Tags are appended to the maps 60a, 60b, 60c, and 60d, and by clicking a certain tag with a mouse pointer, the map with the selected tag is displayed at the frontmost position. The map displayed at the frontmost position also displays camera icons (camera symbols) 62a, 62b, 62c, and 62d indicating the cameras set there. The camera icons 62a, 62b, 62c, and 62d are displayed to point the directions of the corresponding cameras 16.

A video display window 64 has a plurality of video display areas 66a to 66f. In this embodiment, the window 64 has six video display areas, but the number of display areas is not limited to this. The video display window 64 also displays a garbage can icon 66g for stopping display of the camera image which is being currently displayed. The method of using the garbage can icon 66g will be described later.

A camera control panel 68 has buttons for operating the direction (pan/tilt direction) and zooming of the designated camera. Furthermore, in this embodiment, the panel 68 has a camera power button 70 for turning on/off the power source of the designated camera.

Figure 6:
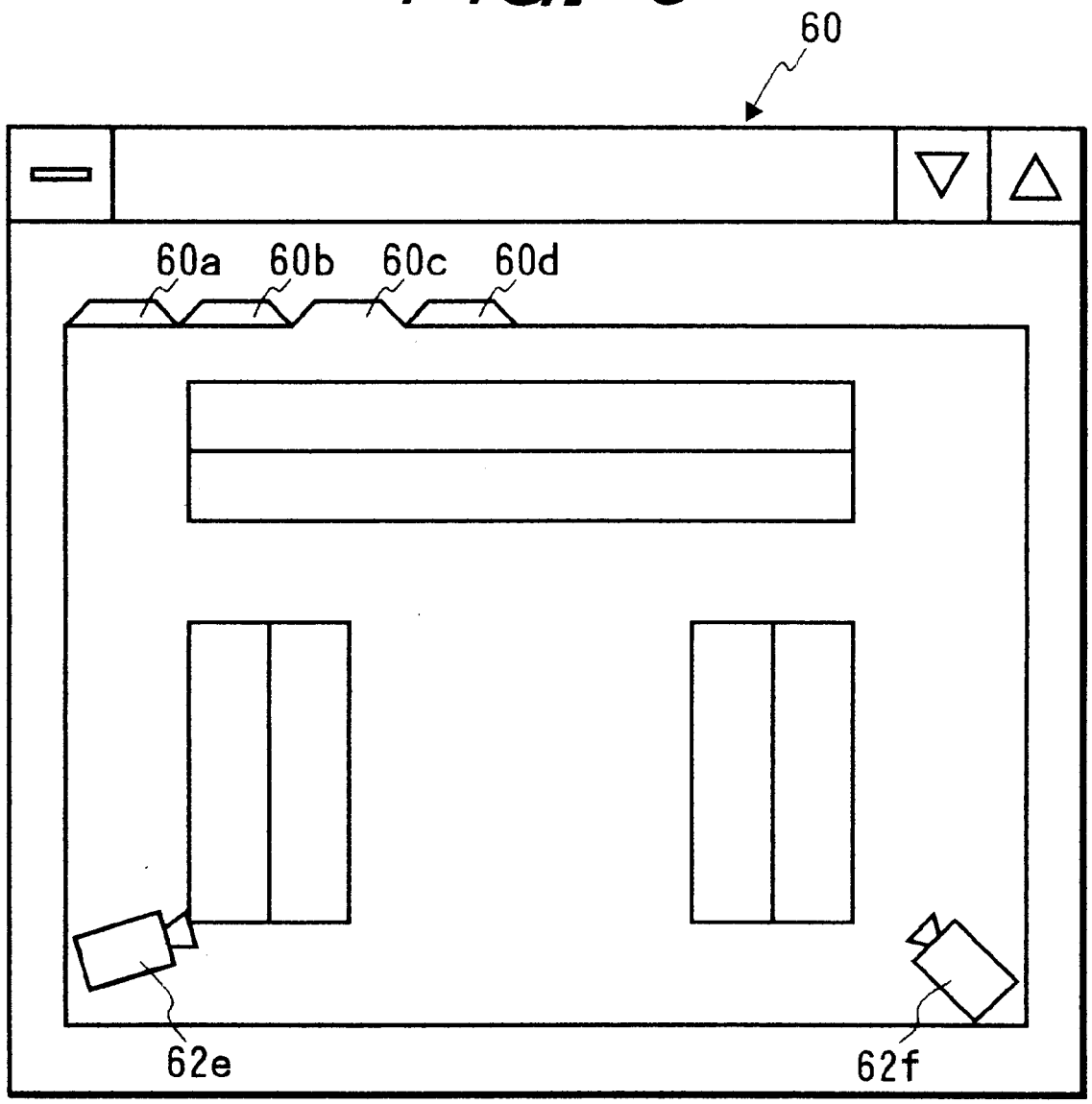
FIG. 6 is a view showing a display example of a map window 60 that displays a map 60c at the frontmost position.

For example, when the map 60c is selected on the map window 60 and is displayed at the frontmost position, the map is displayed, as shown in FIG. 6, and camera icons 62e and 62f indicating the two cameras set there are superimpose-displayed on the map.

A single video display mode button 110 is used for selecting the single video display mode. When this button is clicked, a new window pops up, as indicated by 111 in FIG. 16, and only the selected moving image is displayed. Upon clicking the single video display mode button, a command for stopping video communications with the video transmission terminal stations other than that which is transmitting the designated image is supplied to the terminal stations other than that which is transmitting the designated image, and a command for increasing the frame rate or resolution is transmitted to the video transmission terminal station which is transmitting the designated image so as to effectively use the line capacity released since other video communications are stopped.

Whether the command for increasing the frame rate or the resolution is transmitted upon clicking the single video display mode button is determined by the initial setting set by the user.

The video display window 64 also displays a four-image concurrent display button 112 and a selective display button 113. These buttons are activated only when images from the video transmission terminal station to which the four video cameras are connected via the synthesizer and the switcher, as shown in FIG. 13, are selected. Assume that an image displayed on the area 66a on the video display window 64 is one from the video transmission terminal station, as shown in FIG. 13. When the area 66a is selected using the mouse, the four-image concurrent display button 112 and the selective display button 113 are activated.

Figure 14:
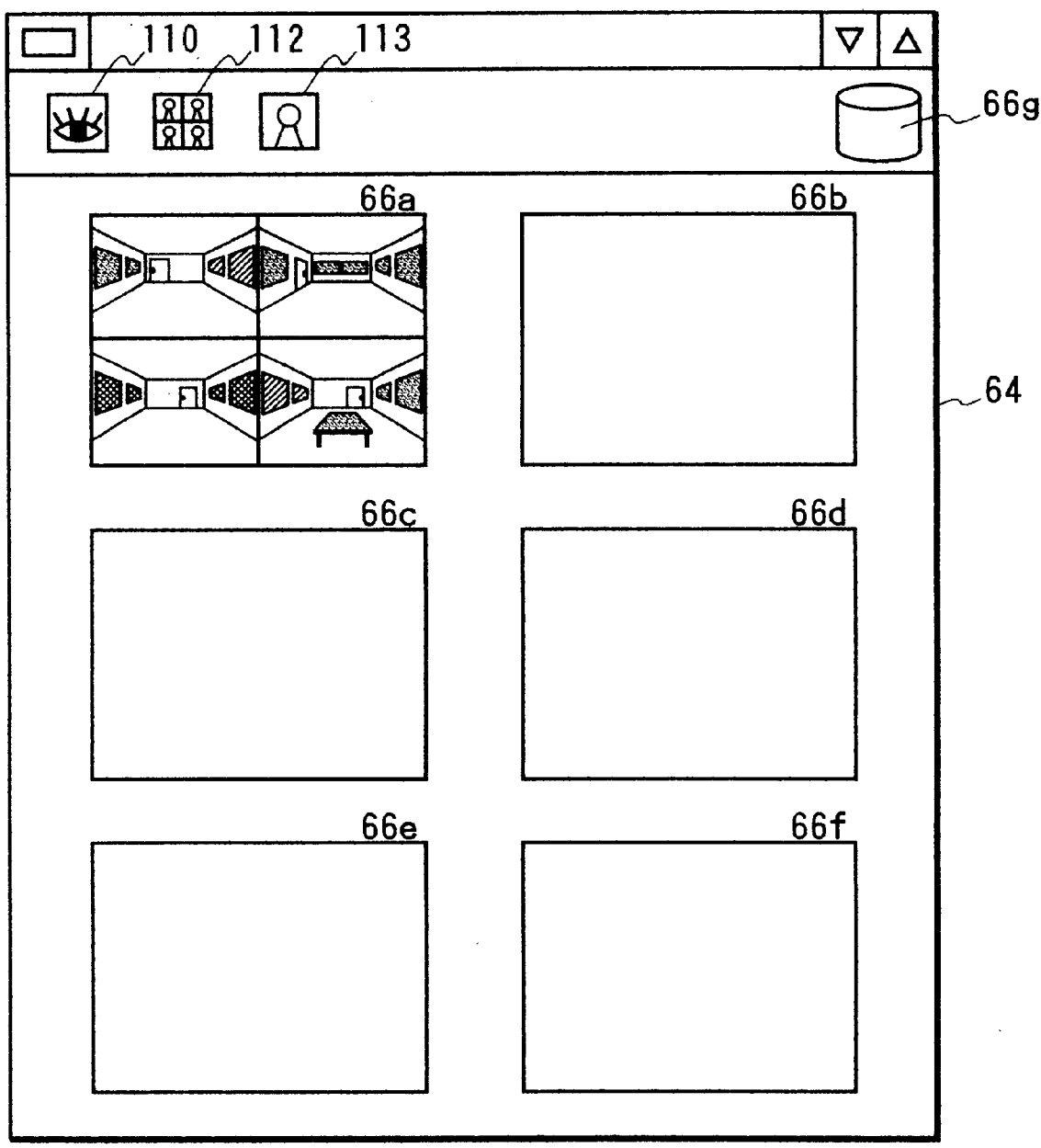
FIG. 14 is a view showing a screen example in the list video mode when images from the video transmission terminal to which the plurality of video cameras are connected via the synthesizer and switcher are displayed.
Figure 15:
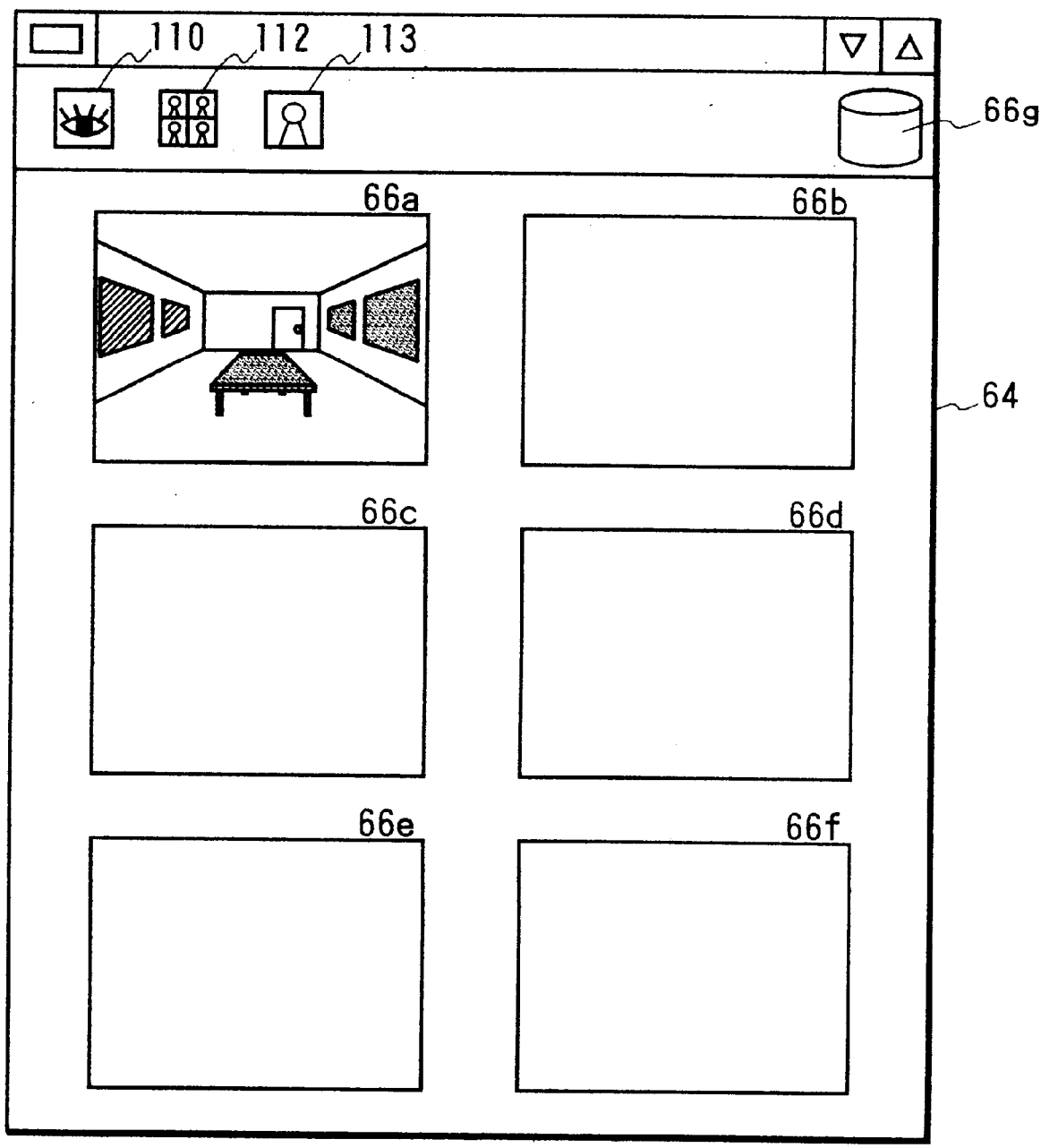
FIG. 15 is a view showing a screen example in the list video mode when only one image from the video transmission terminal to which the plurality of video cameras are connected via the synthesizer and switcher is selectively displayed.

For example, the lower right one of the four images displayed in the four-image concurrent display mode, as shown in FIG. 14, is clicked. Thereafter, when the selective display button 113 is clicked, the selected image is displayed in the full area, as shown in FIG. 15. On the other hand, when the area 66a is clicked in the display state shown in FIG. 15 and thereafter, the four-image concurrent display button 112 is clicked, the display state shown in FIG. 14 is attained.

The camera control in this embodiment will be described in detail below. When an image sensed by a certain camera 16 is to be displayed, the camera icon that indicates the camera 16 is selected on the corresponding map displayed on the map window 60, and is superposed and released on one of the video display areas 66a to 66f on the video display window 64 (i.e., by a so-called drag and drop operation). Normally, an unused one of the video display areas 66a to 66f is selected. However, when the video display area in use is selected, a warning indicating that the camera must be switched is displayed, thus prompting the user to select whether the operation is to continue or stop. When there is no camera 16 connected to the switcher 101 and the synthesizer 102 on the selected one of the tags 60a to 60d, the above-mentioned display buttons 112 and 113 are not displayed. The video reception terminal station 18 identifies the presence/absence of connection to the switcher 101 and the synthesizer 102 by exchanging status with the video transmission terminal station 12 displayed on the map upon switching the map.

Figure 7:
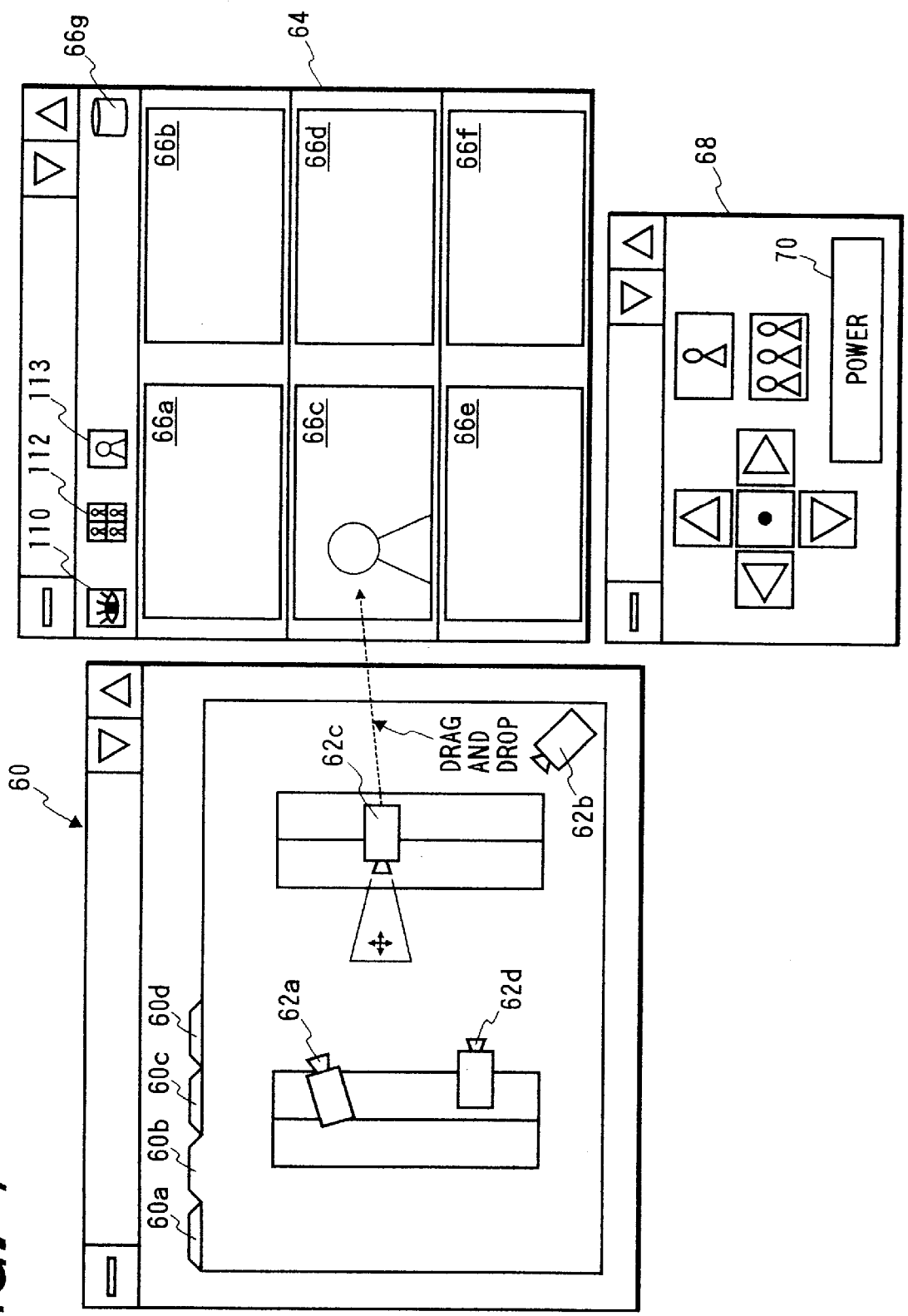
FIG. 7 is an explanatory view of the operation for starting video display.
Figure 8:
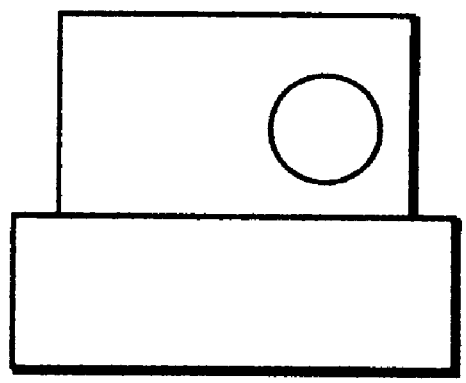
FIG. 8 is a view showing an example of the shape of a mouse cursor during the video display start operation.

FIG. 7 shows the drag and drop operation of the camera icon 62c onto the video display area 66c, and an image from the camera represented by the camera icon 62c is displayed on the video display area 66c. While the camera icon is being dragged, the shape of the mouse cursor changes, as shown in FIG. 8, thus informing the user that dragging for video display is in progress. The map management software program 54 informs the video reception software program 52 of the camera ID corresponding to the selected camera icon. The video reception software program 52 checks the camera direction, the camera name, and the host name to which the camera is connected on the basis of the ID, and supplies these pieces of information to the camera control client 50 and the map management software program 54.

The camera control client 50 establishes connection to the camera control server 56 of the video transmission terminal station 12, to which the selected camera is connected, via the network on the basis of the information from the video reception software program 52. Thereafter, the camera control client 50 transmits a camera control signal based on the user's operation to the camera control server 56 connected via the network. The camera control server 56 controls the camera 16 in accordance with the received camera control signal, and informs the camera control client 50 of the current information of the camera 16. The camera control client 50 informs the video reception software program 52 of the current information of the selected camera 16. The video reception software program 52 informs the map management software program 54 of such information as well.

Figure 9:
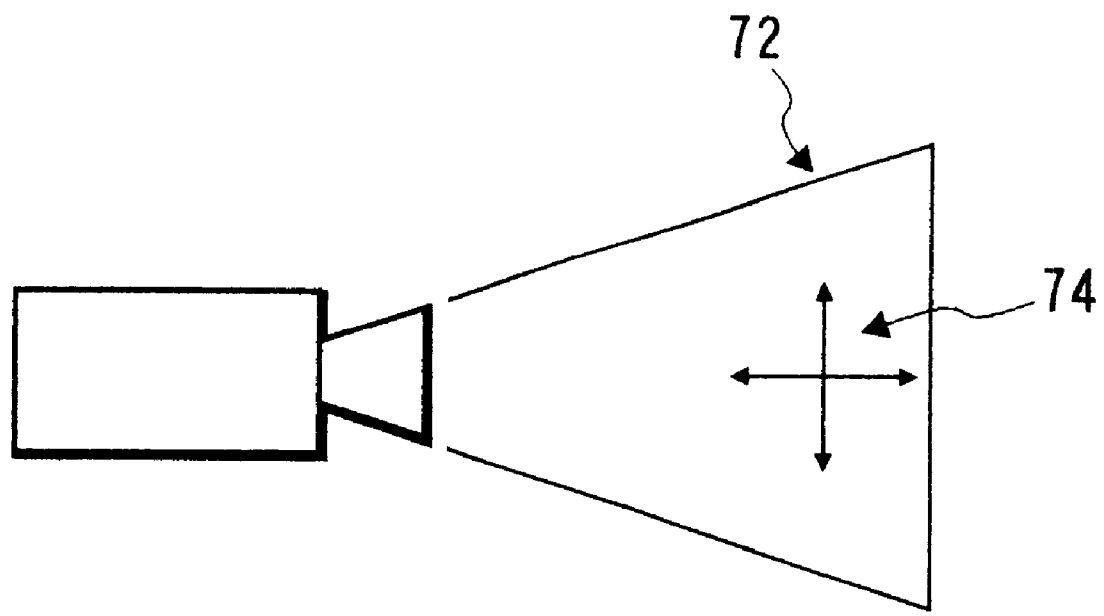
FIG. 9 is a view showing an example of the display pattern of a camera icon during video display.

The map management software program 54 changes the direction of the camera icon in correspondence with the direction of the corresponding camera 16, displays a scope 72 indicating that an image is being displayed on the selected camera icon, and also displays a control pointer 74 for controlling panning/tilting and zooming in the scope 72, as shown in FIG. 9. As described previously, the map management software program 54 always receives variable information (especially, pan/tilt information) of the camera 16 in image display from the video reception software program 52, and changes the directions of the camera icons 62a to 62f in correspondence with the received information.

Figure 10:
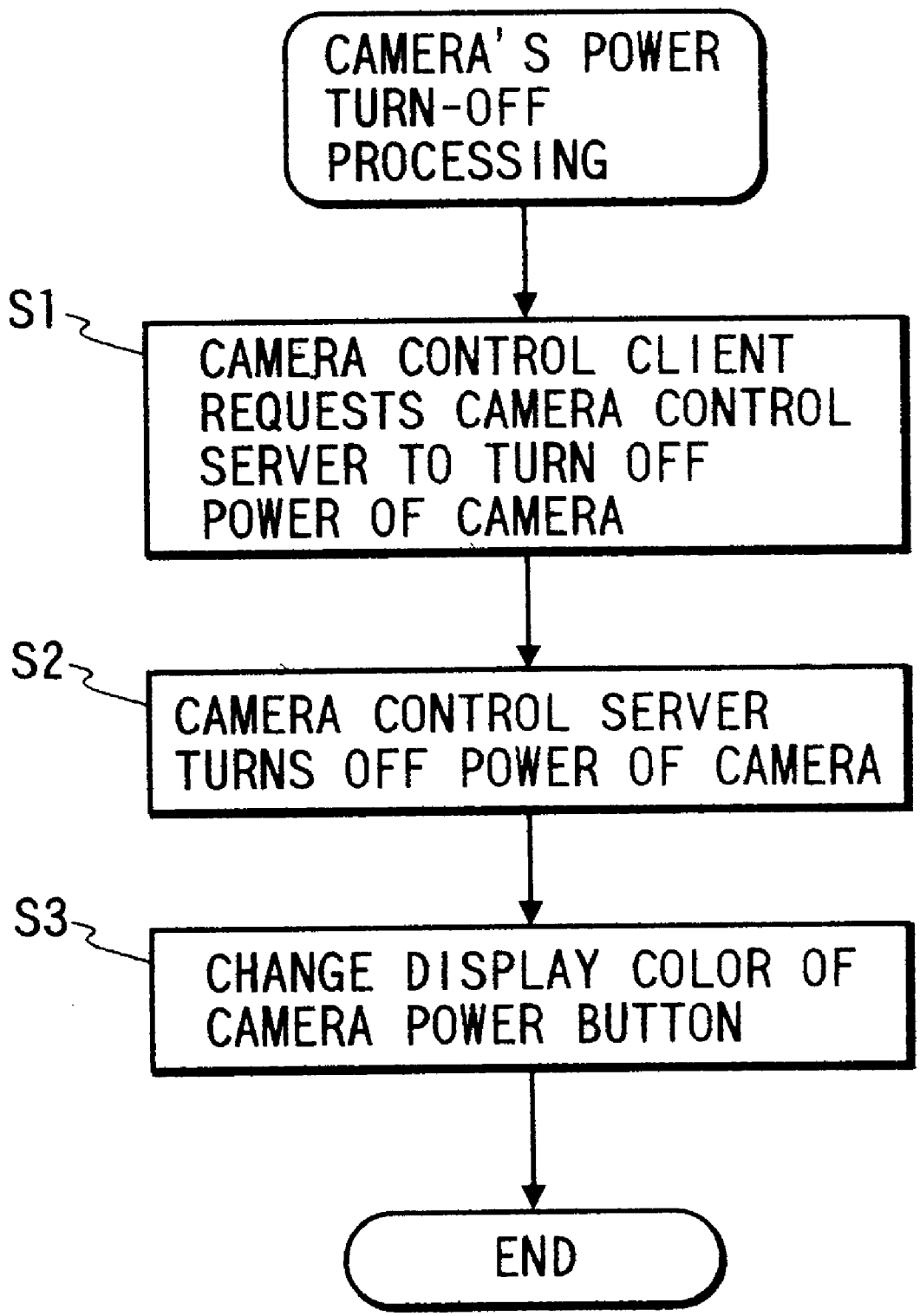
FIG. 10 is a flow chart of the power turn-off processing.

FIG. 10 is a flow chart showing the processing for turning off the power source of an arbitrarily selected camera 16. When the power source of the selected camera is to be temporarily turned off, the camera icon indicating the camera to be turned off is selected, and the camera power button 70 on the camera control panel 68 is pressed. Note that the camera power button 70 is displayed in different colors and/or with different characters (e.g., "power OFF" or "power ON") in correspondence with the power state of the camera to be controlled. Upon operation of the camera power button 70, the camera control client 50 supplies a camera's power turn-off request to the camera control server 56 of the video transmission terminal station 12, to which the camera 16 of interest is connected, via the network 10 (S1).

The camera control server 56 controls the camera control device 14 via the I/O board 34 to turn off the power source of the video camera 16 of interest (S2). On the other hand, the display pattern of the camera power button 70 is changed to indicate the power OFF state (S3). With this display, the operator can recognize that the camera of interest is turned off.

When an OFF camera is to be turned on again, the camera power button 70 need only be pressed again. In this case, a camera's power turn-on request, in turn, is supplied to the camera control server 56 to turn on the power source of the video camera 16 of interest. Thereafter, the color of the camera power button 70 is changed to indicate the power ON state.

In this manner, power supply to an arbitrary camera can be controlled from the monitoring terminal station 18, thus reducing power consumption.

The video transmission software program 58 transmits a camera image in accordance with a video transmission request from the video reception software program 52. More specifically, the video reception software program 52 requests the video transmission software program 58 of the video transmission terminal station 12 to which the selected camera is connected to transmit video data for one frame via the network 10. In response to this request, the video transmission software program 58 compresses video data for the latest frame from the camera 16, segments the compressed data into packets, and transmits the packets to the video reception software program 52 as the request source. The video reception software program 52 reconstructs the frame from the received packets, expands the compressed data, and displays the expanded image on the previously designated one of the video display areas 66a to 66f. Thereafter, the video reception software program 52 issues a video transmission request again. By repeating this processing, the video reception terminal station 18 receives and displays a camera image at a remote place via the network.

When images from a plurality of cameras are to be concurrently displayed, sending a video transmission request and reception and display of an image are repetitively executed in turn for the video transmission software programs 58 of the video transmission terminals 12 to which the respective cameras are connected.

Figure 11:
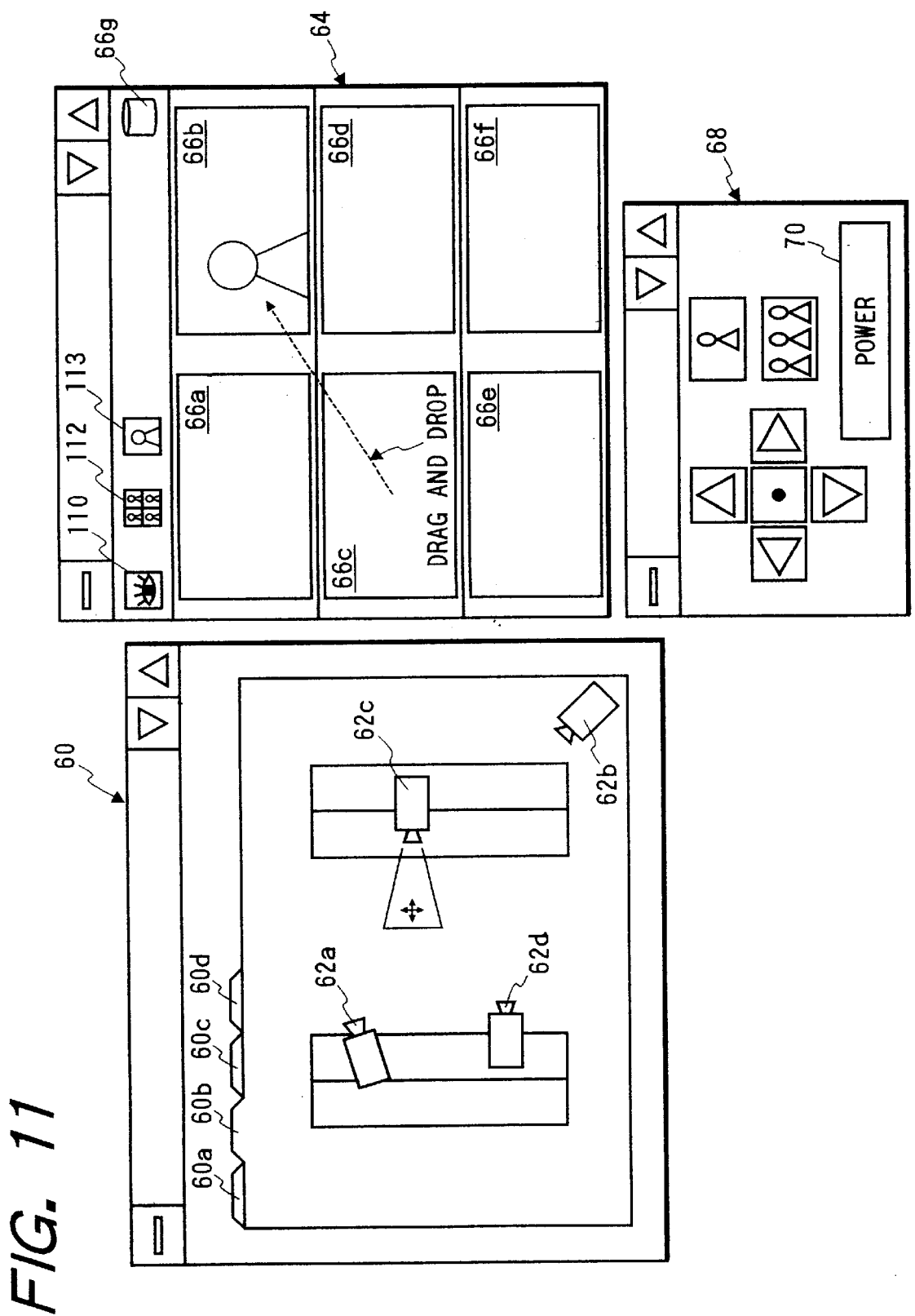
FIG. 11 is an explanatory view of the video display area changing operation.

The display position of the received camera image can be changed by the drag and drop operation. For example, as shown in FIG. 11, when the display position is to be changed from the video display area 66c to the video display area 66b, the mouse pointer is moved to a position on the video display area 66c and the mouse button is pressed. While the mouse button is held down, the mouse pointer is moved to a position on the video display area 66b, and the mouse button is released on the video display area 66b.

In response to such operation, the video reception software program 52 stops video display on the video display area (the area 66c in FIG. 11) selected first, and assigns the camera image displayed there to the video display area (the area 66b in FIG. 11) selected second. Note that this operation does not disconnect any logic network connection.

Figure 12:
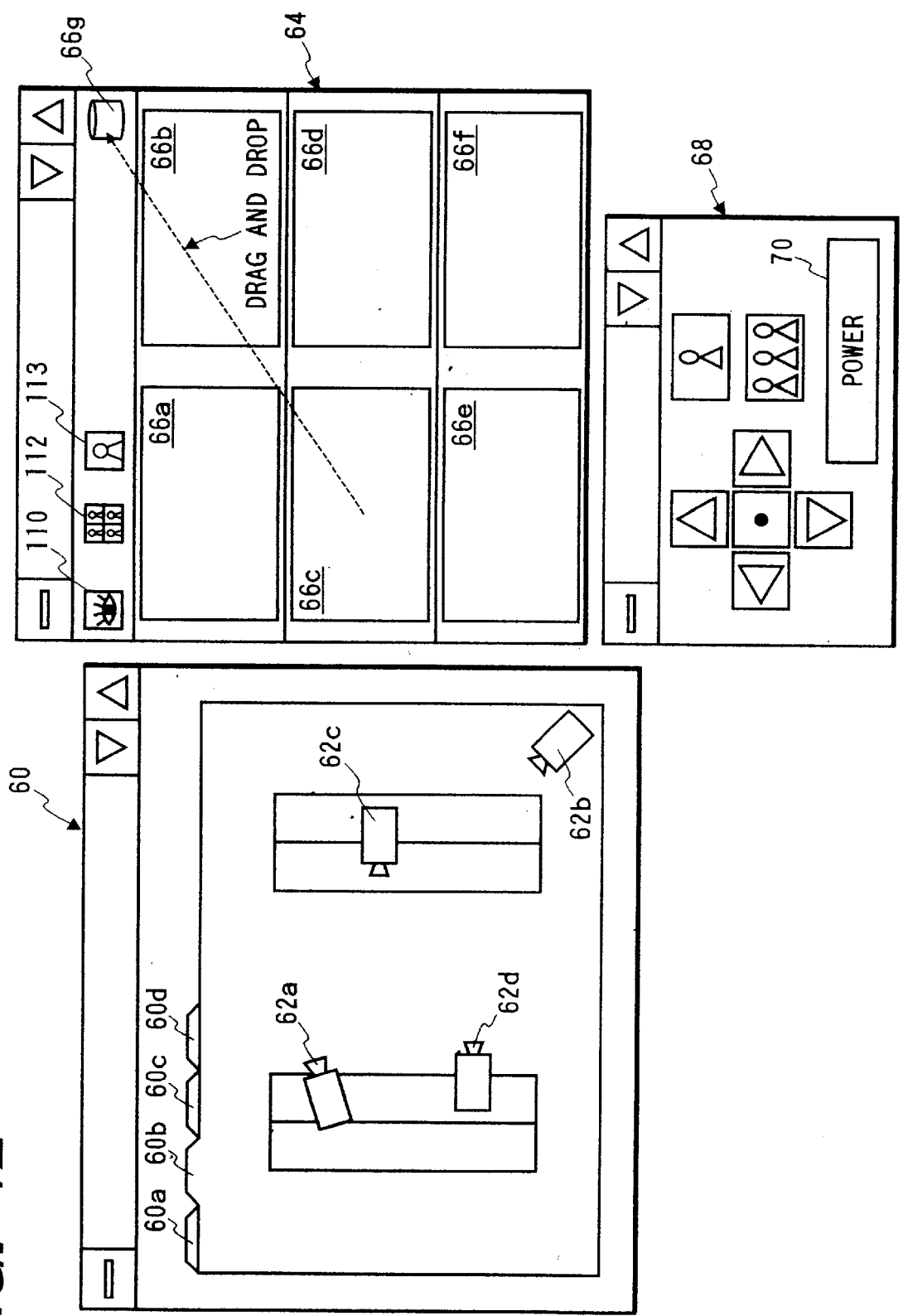
FIG. 12 is an explanatory view of the video display stop operation.

In order to stop video display, an image displayed on the video display area to be stopped need only be dragged and dropped onto a garbage can icon 66g. FIG. 12 shows an example wherein display of an image displayed on the video display area 66c is to be stopped. The mouse pointer is moved to a position on the video display area 66c, and the mouse button is pressed. While the mouse button is held down, the mouse pointer is moved to a position on the garbage can icon 66g and the mouse button is released there.

In response to such operation, the video reception software program 54 stops to send a video transmission request to the video transmission software program 58 of the video transmission terminal station to which the camera, whose image is displayed on the selected video display area (the area 66c in FIG. 12), is connected. Furthermore, the video reception software program 54 informs the camera control client 50 and the map management software program 54 of stopping the video display. In response to this information, the camera control client 50 disconnects the network connection to the camera control server 56 of the corresponding video transmission terminal station 12, and clears the corresponding video display area (the area 66c in FIG. 12). Also, the map management software program 54 deletes the scope displayed on the corresponding camera icon (e.g., the icon 62c) and updates the map.

In this embodiment, by dragging and dropping the camera symbol on the map onto the video display area, the logic network connection between the video reception terminal station and the video transmission terminal station can be established. By the drag and drop operation between the video display area where the camera image is displayed, and another arbitrary video display area, the video display position can be changed. By the drag and drop operation from the video display area where the camera image is displayed to the display stop symbol, video display can be stopped. In this way, the camera image display start operation, display position changing operation, and display stop operation can be very easily attained.

Figure 16:
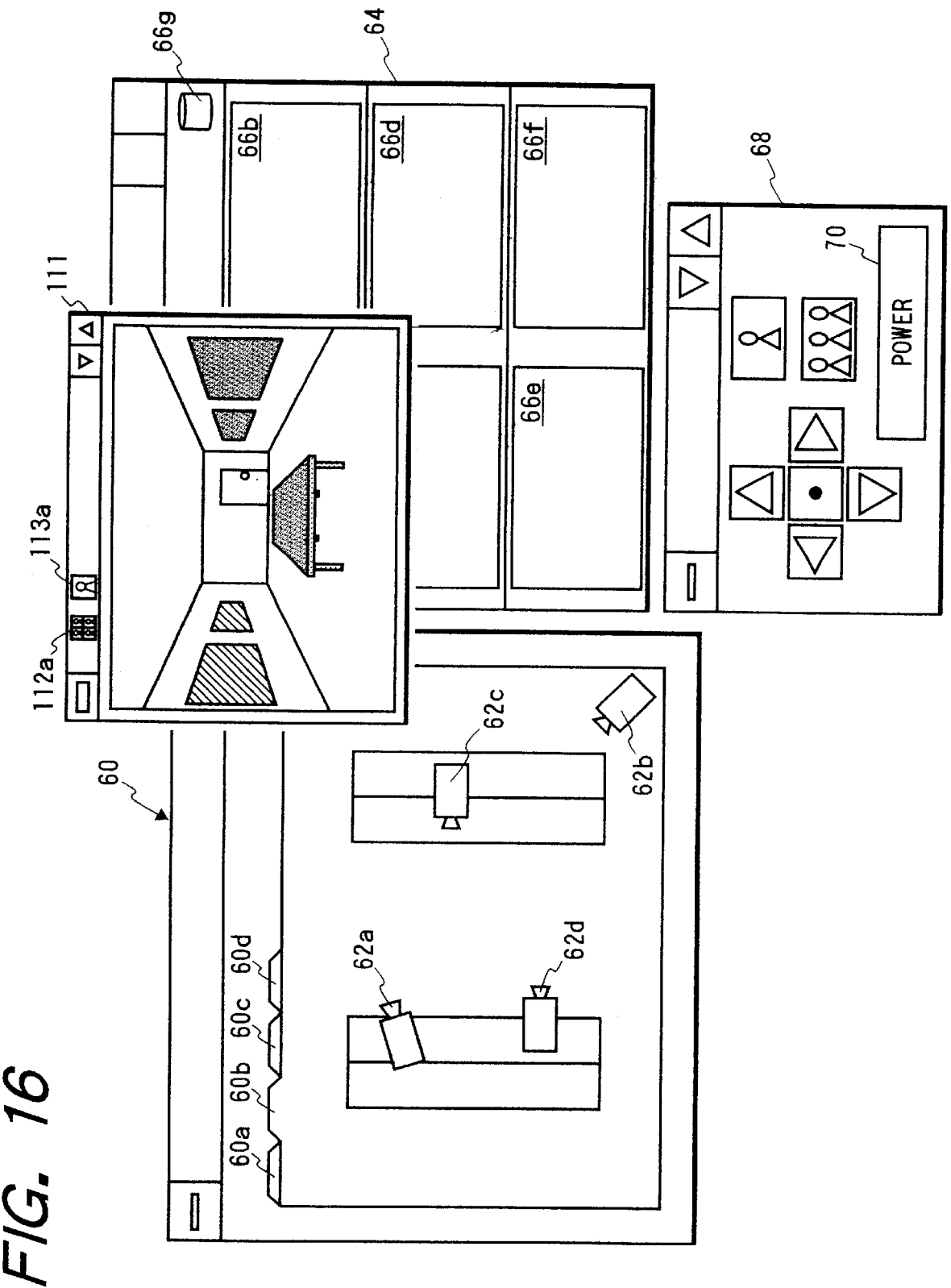
FIG. 16 is a view showing a screen example when single video display window is popped up.

The operation in the single video display mode will be explained below. When one of the video display areas 66a to 66f is designated using the mouse 30 and thereafter, the single video display mode button is clicked, the single video display window 111 is popped up, and the selected image is displayed, as shown in FIG. 16.

A case will be examined below wherein one of the images from the video transmission terminal station to which the four video cameras are connected via the synthesizer and the switcher is to be displayed in the single video display mode. In this case, the images displayed on the area 66a in FIGS. 14 and 15 are those from the video transmission terminal station shown in FIG. 13.

Figure 17:
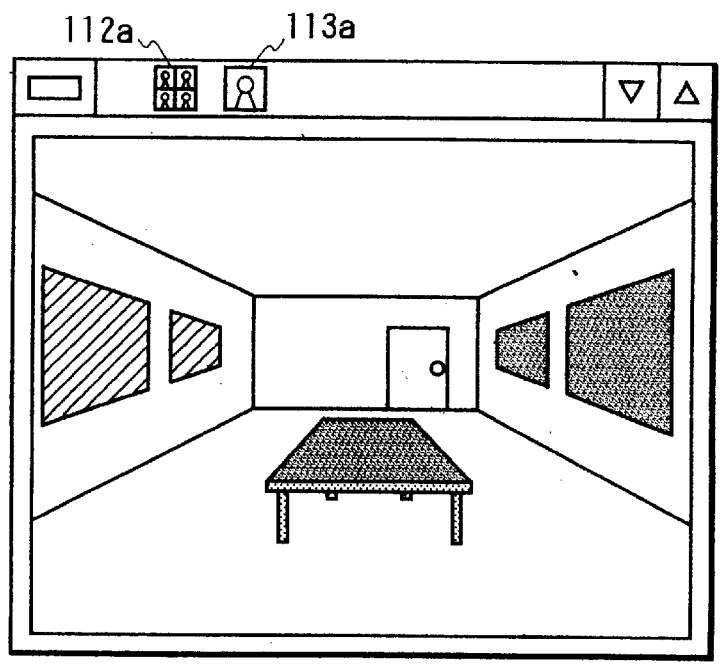
FIG. 17 is a view showing a screen example in the single video display mode when only one image from the video transmission terminal to which the plurality of video cameras are connected via the synthesizer and switcher is selectively displayed.
Figure 18:
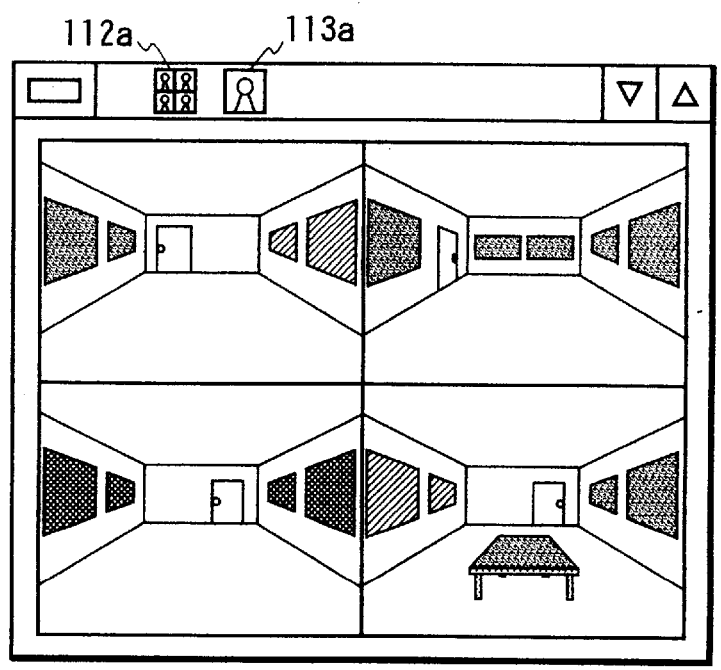
FIG. 18 is a view showing a screen example in the single video display mode when images from the video transmission terminal to which the plurality of video cameras are connected via the synthesizer and switcher are synthesized and displayed.

When the single video display mode button 110 is clicked in the display state shown in FIG. 14, the single video display window 111 pops up, as shown in FIG. 18. Since the selected display area displays images from the video transmission terminal station to which the four video cameras are connected via the synthesizer and the switcher, a four-image concurrent display button 112a and a selective display button 113a appear on the single video display window 111 as well. At this time, when the lower right image in FIG. 18 is clicked using the mouse and the selective display button 113a is then clicked, an image is displayed, as shown in FIG. 17.

The image shown in FIG. 17 is visually satisfactorily displayed in accordance with a command for increasing the frame rate or resolution as in changes in image upon switching to the single display mode described above.

On the other hand, when the single video display mode button 110 is clicked in the display state shown in FIG. 15, the single video display window 111 shown in FIG. 17 pops up. Since the designated area displays images from the video transmission terminal station to which the four video cameras are connected via the synthesizer and the switcher, the four-image concurrent display button 112a and the selective display button 113a appear on the single video display window 111 as well. At this time, when the four-image concurrent display button 112a is clicked using the mouse, the four images are concurrently displayed, as shown in FIG. 18.

In this embodiment, since images from the video transmission terminal station to which the four video cameras are connected via the synthesizer and the switcher can be synthesized or selected and displayed even in the single video display mode, video synthesis or selective display can be made independently of the single video display mode or list video display mode.

The automatic power turn-off processing for the camera connected via the switcher will be explained below.

The camera's power turn-off processing shown in the flow chart in FIG. 10 is executed by pressing the camera power button 70 on the camera control panel 68. Alternatively, the flow chart in FIG. 19 shows an example of the processing for automatically turning off the power source of a camera 16 whose image ceases to be displayed on the video display window 64 upon switching the cameras 16.

When the selective display button 113 is clicked in the display state shown in FIG. 14, the video display area 66a displays an image from the selected one of the four cameras 16a to 16d connected via the switcher 101 (S11), as shown in FIG. 15. Subsequently, the camera control client 50 sends a camera's power turn-off request to the camera control server 56 of the video transmission terminal station 12, to which the corresponding camera (16a to 16d) is connected, via the network 10 (S12). The camera control server 56 controls the switcher 101 via the I/O board 34 to turn off the power sources of the non-selected cameras (S13).

Figure 20:
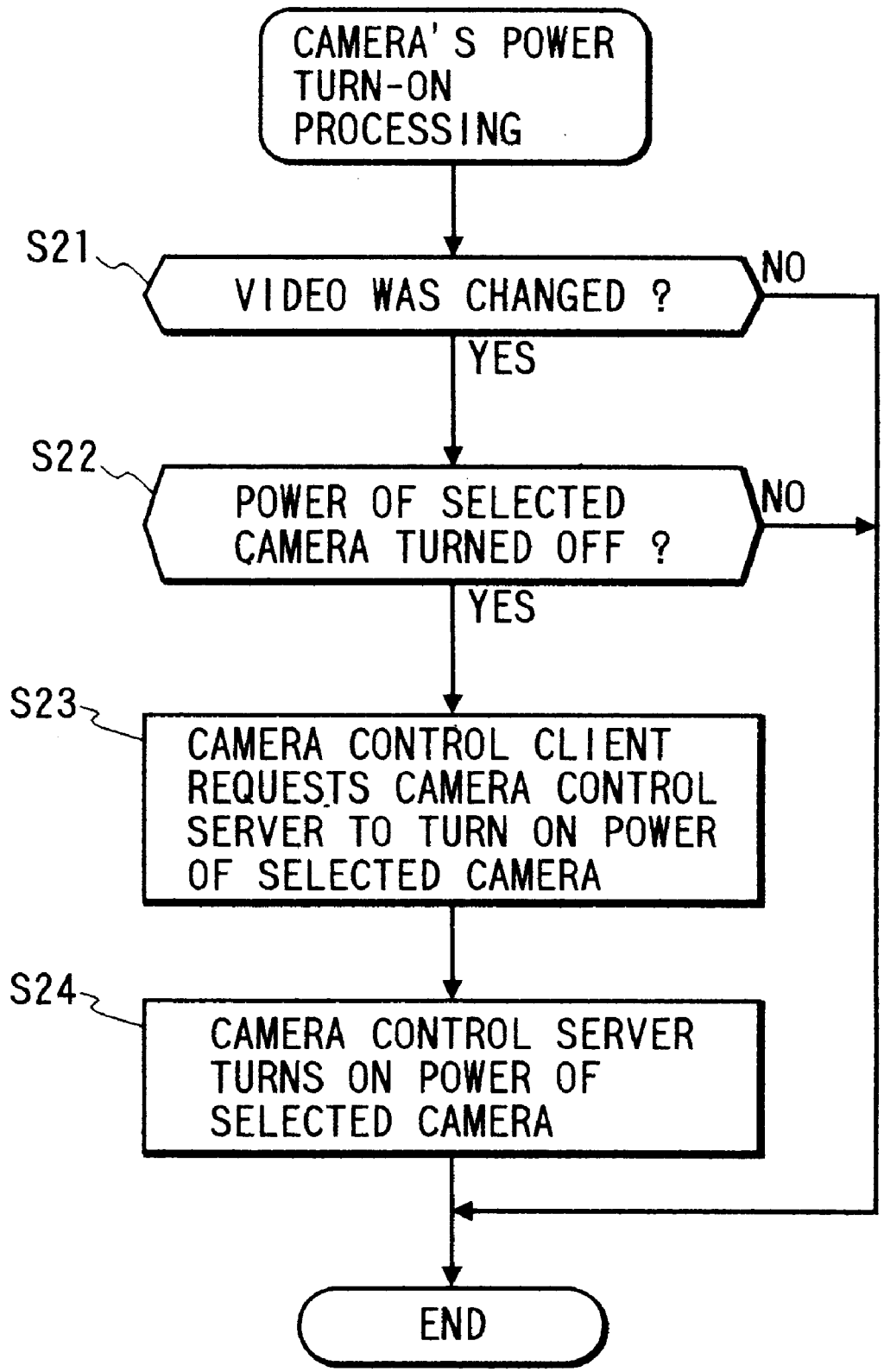
FIG. 20 is a flow chart of the camera's power turn-on processing upon connecting the switcher.

Subsequently, the automatic power turn-on processing for the camera connected via the switcher will be described below with reference to the flow chart shown in FIG. 20.

Figure 19:
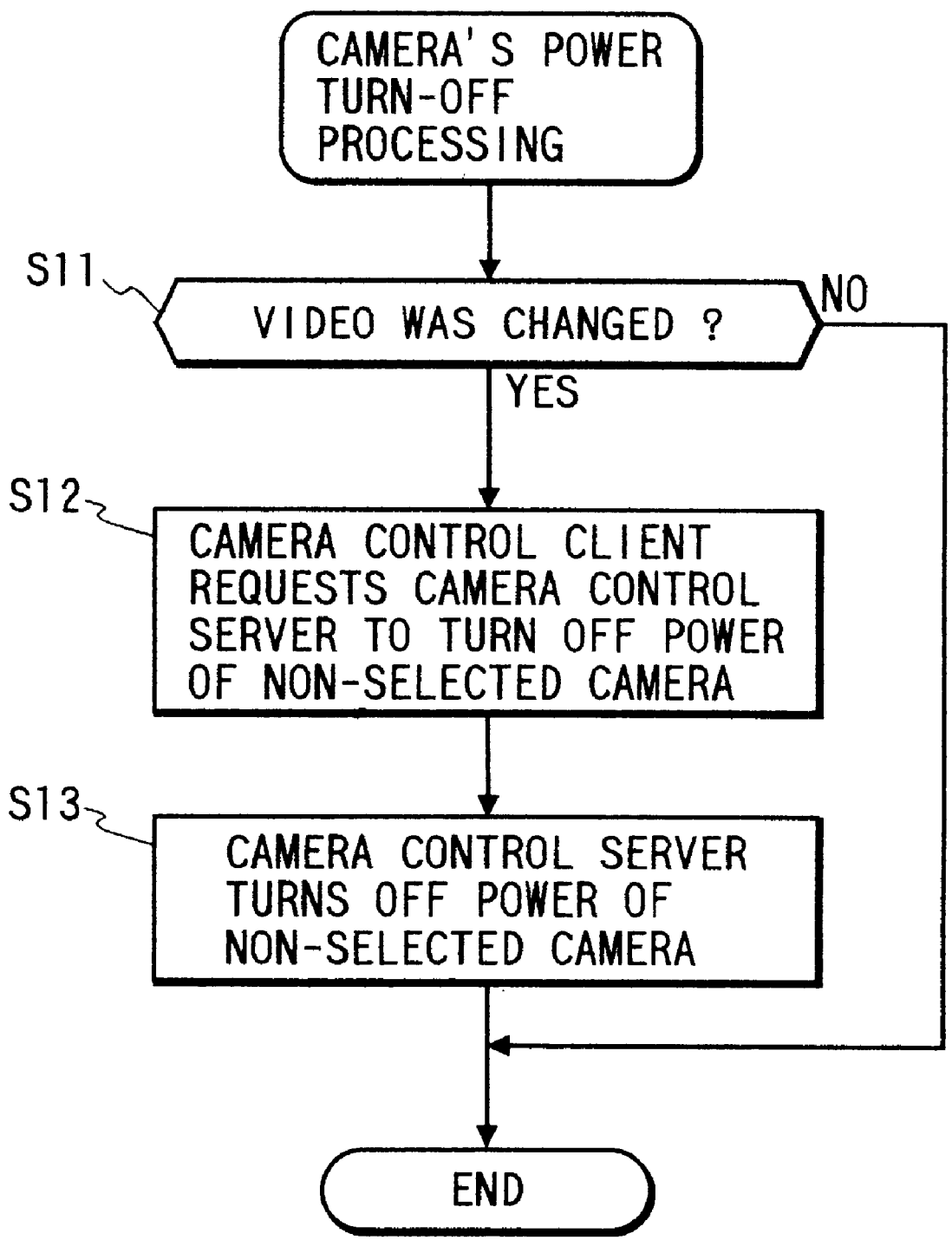
FIG. 19 is a flow chart of the camera's power turn-off processing upon connecting the switcher.

When the image is to be switched as in FIG. 19 (S21), it is checked if the selected camera 16 is OFF (S22). If the selected camera is OFF, the camera control client 50 sends a power turn-on request of the selected camera to the camera control server 56 of the video transmission terminal station 12, to which the corresponding camera (16a to 16d) is connected, via the network 10 (S23). The camera control server 56 controls the switcher 101 via the I/O board 34 to turn on the power source of the selected camera (S24).

With the above-mentioned arrangement, power supply to the non-selected cameras 16 can be controlled by the monitoring terminal station 18 via the switcher 101, thus reducing power consumption.

Figure 21:
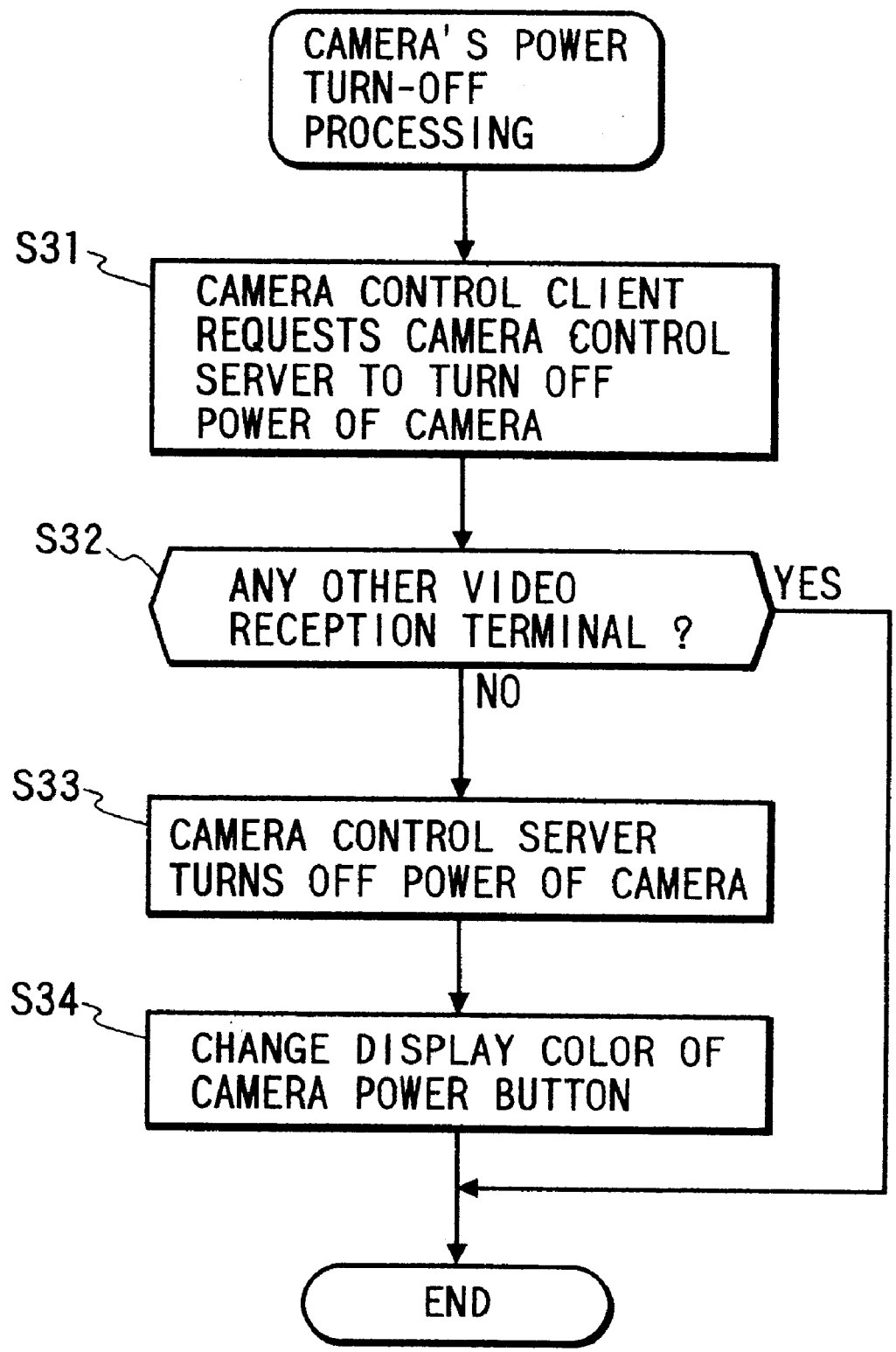
FIG. 21 is a flow chart of the camera's power turn-off processing in improved mode 1.

In the above-mentioned system arrangement, even when a given camera control client 50 inputs a power turn-off request of the camera 16, the camera control server 56 preferably does not turn off the power source of the camera 16 if the image from the camera 16 is being transmitted to the monitor 20 of the reception terminal station 18 different from that corresponding to the given camera control client 50. In this connection, the camera's power turn-off processing executed when a plurality of video reception terminal stations 18 are in operation will be described in detail below with reference to the flow chart shown in FIG. 21.

As shown in FIG. 1, a plurality of video reception terminal stations 18 (18-1 to 18-m) are present on the network 10. When the power source of the selected camera 16 is to be temporarily turned off, one of the camera icons 62a to 62d corresponding to the camera 16 to be turned off is selected, and the camera power button 70 on the camera control panel 68 is pressed. Note that the camera power button 70 is displayed in different colors and/or with different characters (e.g., "power OFF" or "power ON") in correspondence with the power state of the camera to be controlled. Upon operation of the camera power button 70, the camera control client 50 supplies a camera's power turn-off request to the camera control server 56 of the video transmission terminal station 12, to which the camera 16 of interest is connected, via the network 10 (S31).

The camera control server 56 checks if the image from the camera 16 is transmitted to another video reception terminal station 18 (e.g., 18-2) different from the video reception terminal station 18 (e.g., 18-1) corresponding to the camera control client 50 (S32). If the other video reception terminal station 18-2 which is receiving the image is detected, the camera control server 56 does not execute any camera's power turn-off processing. On the other hand, if the other video reception terminal station 18-2 which is receiving the image is not detected, the camera control server 56 executes the camera's power turn-off processing in steps S33 and S34. Since the processing in steps S33 and S34 is the same as that in steps S2 and S3 in the flow chart in FIG. 10, a detailed description thereof will be omitted.

In this way, the monitoring (video reception) terminal station 18 can continue to display a desired image even when another monitoring (video reception) terminal station 18 generates a power turn-off request of the corresponding camera.

Figure 22:
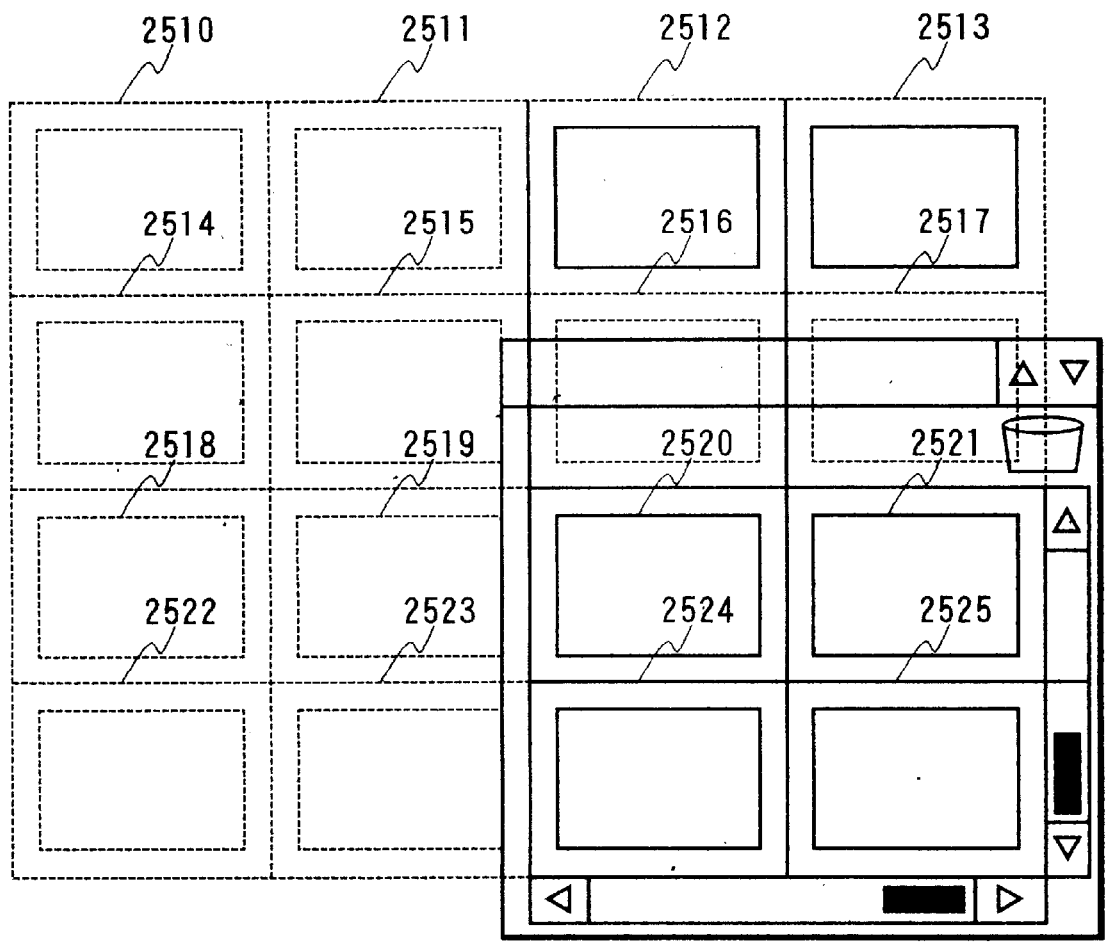
FIG. 22 is a view showing an example of the video display window in improved mode 2.

In FIG. 22, when images are being displayed on all the video display areas, the video transmission terminal stations 12 that take charge of images in areas other than areas 2520, 2521, 2524, and 2525 which actually display images need not transmit any images. Accordingly, the power sources of the cameras 16 that input images which are not displayed on the video display window 64 are preferably turned off in terms of power savings. Such processing will be described in detail below with reference to the flow chart shown in FIG. 23.

Figure 23:
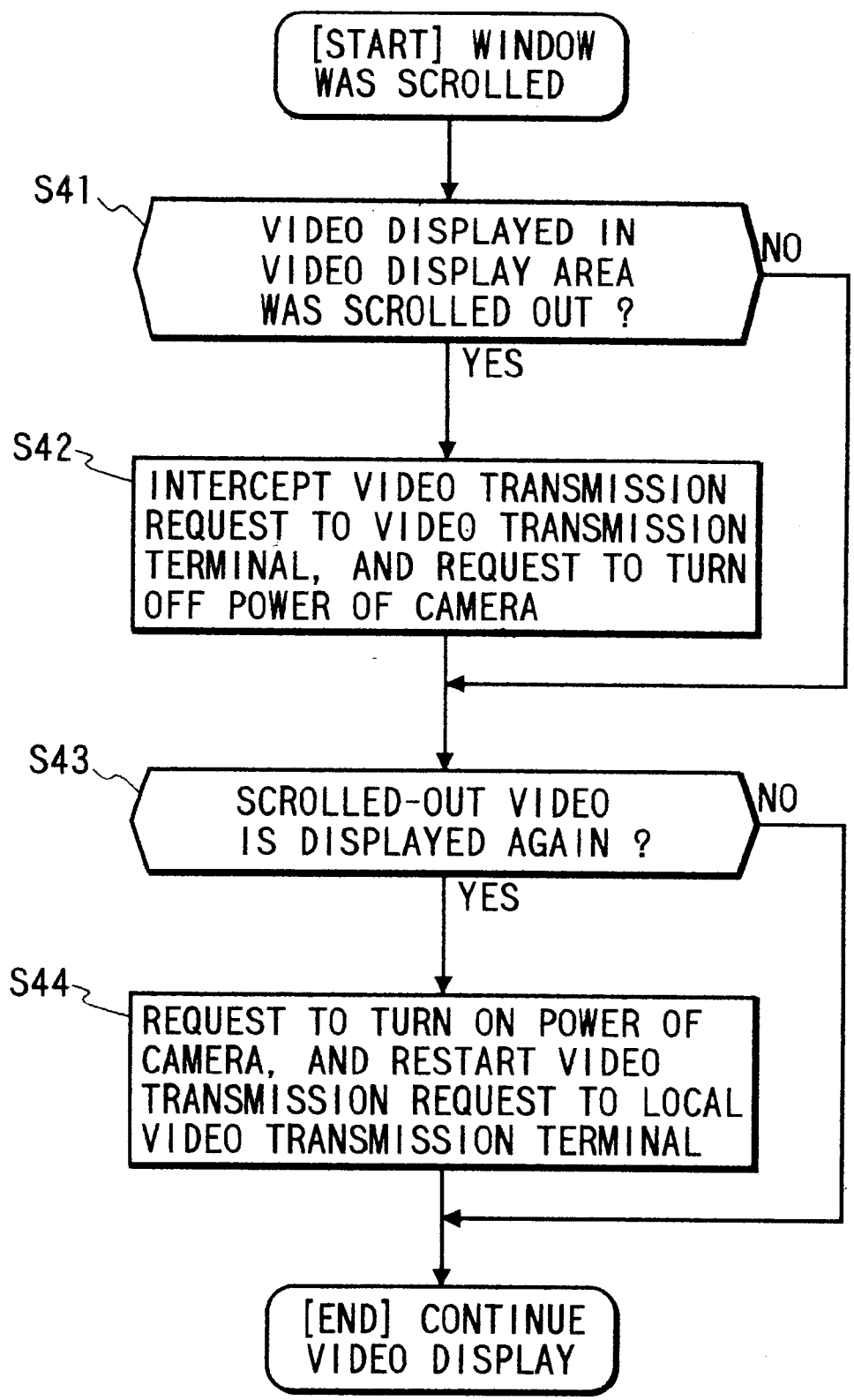
FIG. 23 is a flow chart of the camera's power turn-on/off processing in improved mode 2.

The flow chart in FIG. 23 shows the processing for dynamically executing the power control for the cameras 16 that input images which are not displayed on the video display window 64.

When a given video display area that is displaying an image ceases to be displayed (scrolled out) by scroll processing (S41), the logic network connection is maintained, sending a video transmission request from the monitoring (video reception) terminal station 18 to the corresponding video transmission terminal station 12 is intercepted, and a power turn-off request of the corresponding camera is sent to turn off the power source of the camera 16 (S42). On the other hand, when such video display area is displayed again by the scroll processing (S43), a power turn-on request of the corresponding camera 16 is sent to turn on the camera 16, and thereafter, sending a video transmission request to the corresponding video transmission terminal station 12 is restarted (S44).

With the above-mentioned operations, power supply to the cameras can be automatically controlled in accordance with the scrolling state of the video display areas, and image transmission from the cameras 16 can also be automatically controlled, thus reducing power consumption.

Figure 24:
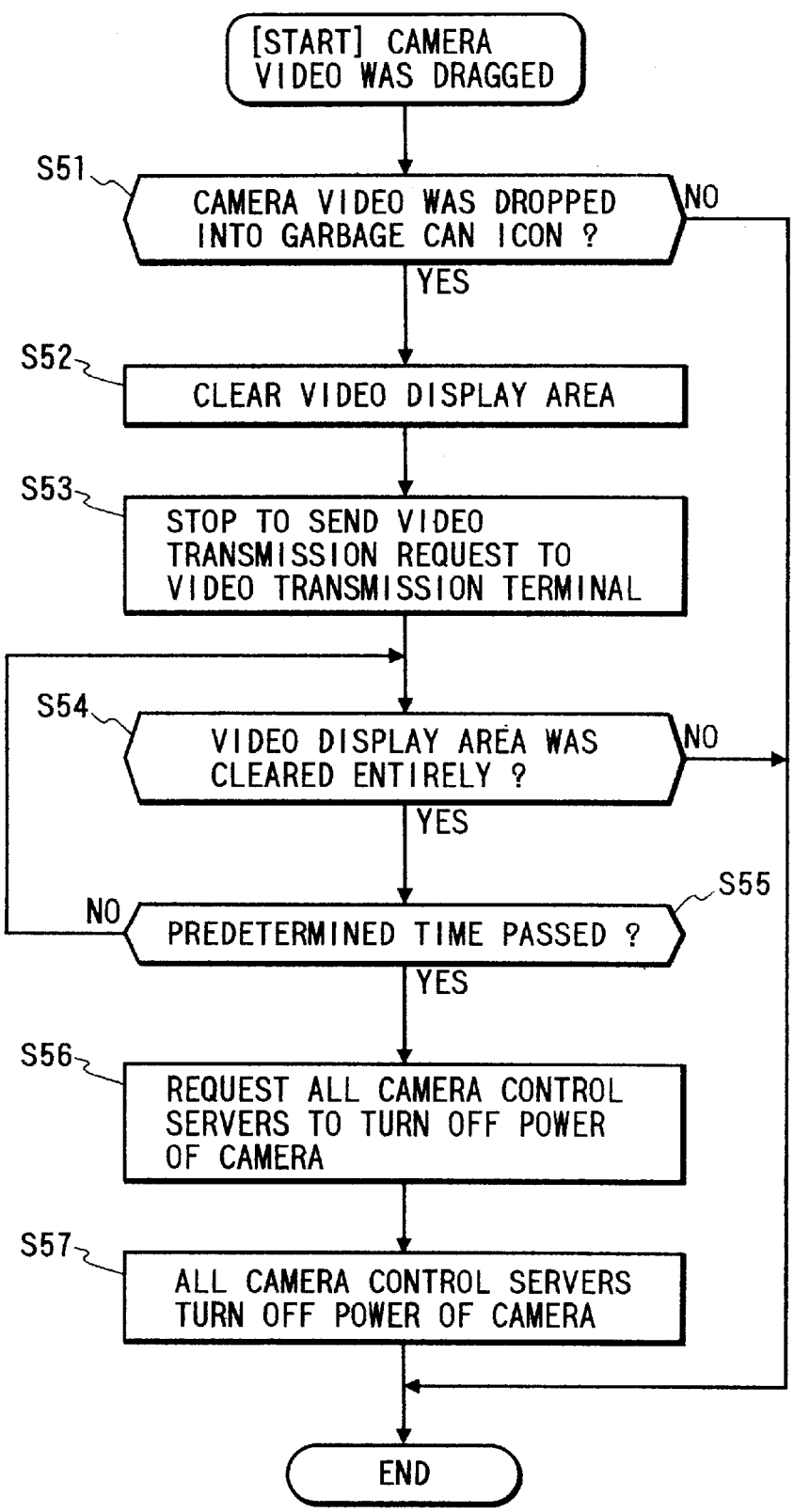
FIG. 24 is a flow chart of the camera's power turn-off processing in improved mode 3.

When there are no more images to be displayed on the video display window 64, the power sources of all the cameras whose images are no longer displayed on the video display window are preferably automatically turned off to save power. Such processing will be described in detail below with reference to the flow chart shown in FIG. 24.

As shown in FIG. 12, when a camera image displayed on the video display area 66c is dragged and dropped onto the garbage can icon 66g (S51), the corresponding video display area 66c is cleared (S52). This processing has already been described previously. Subsequently, sending a video transmission request from the video reception terminal station 18 to the video transmission terminal station 12 is intercepted (S53). This processing is executed by executing a command issued by the processing of the video reception software program 52 on the monitoring (video reception) terminal station 18 side for the video transmission software program 58 of the video transmission terminal station 12.

It is then checked if all the video display areas (66a to 66f) are cleared (S54). This processing is realized by checking the contents of an image memory on the video board 38. If an image is still displayed on any of the video display areas 66a to 66f, the processing ends. On the other hand, when images displayed on all the video display areas 66a to 66f are cleared, it is checked for a predetermined period of time if a video display request is generated (S55). If no video display request is generated within the predetermined period of time, the camera control client 50 sends a camera's power turn-off request to the camera control servers 56 of all the video transmission terminal stations 12 (S56). Subsequently, each camera control server 56 turns off the power source of the camera 16 (S57).

In this manner, power supply to the cameras which do not transmit any image can be controlled, and power can be saved.

Note that the present invention may be applied to either a system constituted by personal computers and video cameras, as described above, or a stand-alone apparatus.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the program code read out by the computer but also by some or all of actual processing operations executed by an OS or the like running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As can be easily understood from the above description, according to the above embodiments, since power supply to the cameras at remote places can be remote-controlled, unmanned video transmission terminal stations can be used, and power can be saved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera control system comprising:

at least one camera;

at least one camera management terminal station for managing said at least one camera, said camera management terminal station including power supply control means for controlling a power source of said at least one camera upon receiving a power on/off instruction signal;

at least one terminal station which communicates with said camera management terminal station via a network to display an image from said at least one camera, said terminal station controlling said power supply control means included in said camera management terminal station by outputting a power on/off instruction signal for an arbitrary one of said at least one camera to said camera management terminal station via said network while said terminal station and said camera management terminal station are connected to the network, wherein said at least one terminal station includes (i) a display unit for displaying an image input from said at least one camera, (ii) switch means for switching the image, which is input by the camera, to be displayed on said display unit, and (iii) instruction means for outputting a power on/off instruction signal of the camera that inputs an image which ceases to be displayed on said display unit upon switching by said switching means, to said camera management terminal station via said network; and display control means for forming a window for displaying the image input from the camera on a screen of said display unit, wherein said switch means switches the camera by switching the window.

2. A system according to claim 1, wherein said display control means can form a plurality of windows equivalent to the window and can display images input from a plurality of cameras.

3. A system according to claim 2, wherein said switch means allows the window to be movable on the screen.

4. A system according to claim 1, wherein said switch means allows the window to be movable on the screen.

5. A system according to claim 4, wherein said switch means allows a plurality of windows equivalent to the window to be concurrently movable on the screen.

6. A camera control system comprising:

at least one camera;

at least one camera management terminal station for managing said at least one camera, said camera management terminal station including power supply control means for controlling a power source of said at least one camera upon receiving a power on/off instruction signal; and at least one terminal station which communicates with said camera management terminal station via a network to display an image from said at least one camera, said terminal station controlling said power supply control means included in said camera management terminal station by outputting a power on/off instruction signal for an arbitrary one of said at least one camera to said camera management terminal station via said network while said terminal station and said camera management terminal station are connected to the network, wherein said at least one terminal station includes (i) a display unit for displaying an image input from said at least one camera, (ii) switch means for switching the image, which is input by the camera, to be displayed on said display unit, and (iii) instruction means for outputting a power on/off instruction signal of the camera that inputs an image which ceases to be displayed on said display unit upon switching by said switching means, to said camera management terminal station via said network, wherein said instruction means sends a camera's power off instruction to the camera management terminal station corresponding to the camera to be turned off, and wherein said camera management terminal comprises determining means for determining whether an image of said camera is being transmitted to a first terminal station when said camera management terminal station is instructed to turn off a power source of the camera by a second terminal station, and said power supply control means does not instruct to turn off a power source of the camera when it is determined that an image of said camera is being transmitted to said first terminal station.

7. A camera control apparatus for controlling a camera, comprising:

a transmitting unit adapted to transmit an image from said camera to a plurality of image receiving terminals; and a switching unit adapted to output a power control signal to turn off a power supply to said camera in accordance with an instruction from one of said plurality of image receiving terminals via a network;

wherein said switching unit prohibits turning off the power supply for said camera in accordance with the instruction from said one of said plurality of image receiving terminals in response to the image from said camera being transmitted to another one of said plurality of image receiving terminals.

8. A camera control method for controlling a camera, comprising:

a transmitting step of transmitting an image from the camera to a plurality of image receiving terminals; and a switching step of outputting a power control signal to turn off a power supply to the camera in accordance with an instruction from one of the plurality of image receiving terminals via a network;

wherein said switching step includes a step of prohibiting the turning off of the power supply to the camera in accordance with the instruction from said one of the plurality of image receiving terminals in response to the image from the camera being transmitted to another one of the plurality of image receiving terminals.

9. A storage medium for computer-readably storing a program for executing a camera control method for controlling a camera, said camera control method comprising:

a transmitting step of transmitting an image from the camera to a plurality of image receiving terminals; and a switching step of outputting a power control signal to turn off a power supply to the camera in accordance with an instruction from one of the plurality of image receiving terminals via a network;

wherein said switching step includes a step of prohibiting the turning off of the power supply to the camera in accordance with the instruction from said one of the plurality of image receiving terminals in response to the image from the camera being transmitted to another one of the plurality of image receiving terminals.

* * * * *

UNITED STATES PATENT AND TRADEMARK OFFICE
CERTIFICATE OF CORRECTION

PATENT NO. : 6,597,389 B2
DATED : July 22, 2003
INVENTOR(S) : Koichiro Tanaka et al.

It is certified that error appears in the above-identified patent and that said Letters Patent is hereby corrected as shown below:

Column 4,
Line 14, "are." should read -- are --.

Column 5,
Line 5, "comprise" should read -- comprises --.

Signed and Sealed this

Twentieth Day of January, 2004

JON W. DUDAS
*Acting Director of the United States Patent and Trademark Office*